United States Patent
Sasaki et al.

(10) Patent No.: US 6,556,970 B1
(45) Date of Patent: Apr. 29, 2003

(54) APPARATUS FOR DETERMINING APPROPRIATE SERIES OF WORDS CARRYING INFORMATION TO BE RECOGNIZED

(75) Inventors: Mikio Sasaki, Kariya (JP); Katsushi Asami, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/490,442

(22) Filed: Jan. 24, 2000

(30) Foreign Application Priority Data

Jan. 28, 1999 (JP) .......................................... 11-020349
Jul. 26, 1999 (JP) .......................................... 11-210819

(51) Int. Cl.[7] ............................................. G10L 15/18
(52) U.S. Cl. ............................... 704/257; 704/9; 704/3; 382/100; 706/50
(58) Field of Search ................................ 704/231, 251, 704/255–257, 270, 3, 9; 706/50; 382/100

(56) References Cited

U.S. PATENT DOCUMENTS

| | | | |
|---|---|---|---|
| 5,680,511 A | * 10/1997 | Baker et al. ................ | 704/257 |
| 5,699,441 A | * 12/1997 | Sagawa et al. ............. | 382/100 |
| 5,950,160 A | 9/1999 | Rozak ........................ | 704/252 |
| 6,029,123 A | * 2/2000 | Suda et al. .................. | 704/9 |

FOREIGN PATENT DOCUMENTS

| | | |
|---|---|---|
| JP | 06-118990 | 4/1994 |
| JP | 8-255166 | 10/1996 |
| JP | 10-124087 | 5/1998 |
| JP | 10-177468 | 6/1998 |
| JP | B2-2802602 | 7/1998 |
| JP | B2-2807236 | 7/1998 |
| JP | B2-2809136 | 7/1998 |
| JP | 11-41538 | 2/1999 |
| JP | 11-52984 | 2/1999 |

* cited by examiner

*Primary Examiner*—David D. Knepper
(74) *Attorney, Agent, or Firm*—Posz & Bethards, PC

(57) ABSTRACT

An apparatus includes a device for generating plural recognition candidates from a user's utterance including a series of words and a device for screening the candidates to select a few appropriate series of words from the candidates. In selecting the appropriate series of words, various factors are taken into consideration. Those factors include evaluation of sentence structures, grammar, relation among words and dialogue topics, and situations surrounding the user. For example, a dialogue topic is first determined, and then a recognition dictionary that only includes words relating to the determined topic is dynamically restructured in the system. Words included in the series of words are recognized and determined with reference to the restructured dictionary. Thus, recognition errors are minimized and determination of a correct series of words is effectively performed.

45 Claims, 20 Drawing Sheets

FIG. 6

SENTENCE STRUCTURE TYPES FOR SEARCHING RESTAURANTS

<u>(I) WANT TO EAT</u>  <u>RAMEN</u> <u>AT X</u> <u>IN OKAZAKI</u>
      A                B      C        D ( 4 ELEMENTS USED )

| TYPE NO. | STRUCTURE | | | | SCORE | TYPE NO. | STRUCTURE | | | | SCORE |
|---|---|---|---|---|---|---|---|---|---|---|---|
| 1 | A | B | C | D | 1 | 13 | C | A | B | D | 1 |
| 2 | A | B | D | C | 4 | 14 | C | A | D | B | 4 |
| 3 | A | C | B | D | 4 | 15 | C | B | A | D | 7 |
| 4 | A | C | D | B | 4 | 16 | C | B | D | A | 4 |
| 5 | A | D | B | C | 4 | 17 | C | D | A | B | 1 |
| 6 | A | D | C | B | 7 | 18 | C | D | B | A | 1 |
| 7 | B | A | C | D | 4 | 19 | D | A | B | C | 1 |
| 8 | B | A | D | C | 7 | 20 | D | A | C | B | 4 |
| 9 | B | C | A | D | 4 | 21 | D | B | A | C | 4 |
| 10 | B | C | D | A | 1 | 22 | D | B | C | A | 4 |
| 11 | B | D | A | C | 4 | 23 | D | C | A | B | 4 |
| 12 | B | D | C | A | 7 | 24 | D | C | B | A | 10 |

FIG. 7

SENTENCE STRUCTURE TYPES FOR SEARCHING RESTAURANTS (I) WANT TO EAT  RAMEN  AT X  IN OKAZAKI
    ‾‾‾‾‾‾‾‾‾‾   ‾‾‾‾‾  ‾‾‾   ‾‾‾‾‾‾‾‾‾
        A          B     C        D
           ( 3 ELEMENTS USED )

| TYPE NO. | STRUCTURE | | | SCORE | TYPE NO. | STRUCTURE | | | SCORE |
|---|---|---|---|---|---|---|---|---|---|
| 25 | A | B | C | 1 | 37 | C | A | B | 4 |
| 26 | A | B | D | 1 | 38 | C | A | D | 4 |
| 27 | A | C | B | 4 | 39 | C | B | A | 7 |
| 28 | A | C | D | 1 | 40 | C | B | D | 4 |
| 29 | A | D | B | 4 | 41 | C | D | A | 1 |
| 30 | A | D | C | 10 | 42 | C | D | B | 1 |
| 31 | B | A | C | 4 | 43 | D | A | B | 4 |
| 32 | B | A | D | 7 | 44 | D | A | C | 4 |
| 33 | B | C | A | 1 | 45 | D | B | A | 10 |
| 34 | B | C | D | 1 | 46 | D | B | C | 4 |
| 35 | B | D | A | 7 | 47 | D | C | A | 7 |
| 36 | B | D | C | 4 | 48 | D | C | B | 10 |

FIG. 8

SENTENCE STRUCTURE TYPES FOR SEARCHING RESTAURANTS (I) WANT TO EAT  RAMEN  AT X  IN OKAZAKI
  —————————————  —————  ————  —————————
        A          B     C         D ( 2 ELEMENTS USED )

| TYPE NO. | STRUCTURE | | SCORE | TYPE NO. | STRUCTURE | | SCORE |
|---|---|---|---|---|---|---|---|
| 49 | A | B | 4 | 55 | C | A | 4 |
| 50 | A | C | 4 | 56 | C | B | 7 |
| 51 | A | D | 1 | 57 | C | D | 1 |
| 52 | B | A | 7 | 58 | D | A | 7 |
| 53 | B | C | 4 | 59 | D | B | 7 |
| 54 | B | D | 1 | 60 | D | C | 10 |

FIG. 9

SENTENCE STRUCTURE TYPES FOR SEARCHING RESTAURANTS (I) WANT TO EAT  RAMEN  AT X  IN OKAZAKI
  —————————————  —————  ————  —————————
        A          B     C         D ( 1 ELEMENTS USED )

| TYPE NO. | STRUCTURE | SCORE | TYPE NO. | STRUCTURE | SCORE |
|---|---|---|---|---|---|
| 61 | A | 7 | 63 | C | 4 |
| 62 | B | 7 | 64 | D | 1 |

FIG. 19

| UTTERANCE \ RESPONSE | NO RESPONSE | CONFIR-MATION | HOLDING | JUDGEMENT | ANSWER | OTHERS |
|---|---|---|---|---|---|---|
| DRAWING ATTENTION | — | ○ | — | — | ○ | ○ |
| REPORT | ○ | ○ | — | — | — | ○ |
| NOTIFICATION | — | ○ | ○ | — | — | ○ |
| TEACHING | — | ○ | — | ○ | — | ○ |
| EXPLANATION | ○ | ○ | — | — | — | ○ |
| INSTRUCTION | — | ○ | ○ | — | — | ○ |
| INQUIRY | — | ○ | ○ | ○○ | ○ | ○ |
| WARNING | — | ○ | — | — | ○ | ○ |
| URGING | — | ○ | ○ | — | ○ | ○ |
| QUESTION | — | ○ | ○ | ○ | ○ | ○ |

APPARATUS FOR DETERMINING APPROPRIATE SERIES OF WORDS CARRYING INFORMATION TO BE RECOGNIZED

CROSS-REFERENCE TO RELATED APPLICATION

This application is based upon and claims benefit of priority of Japanese Patent applications No. Hei-11-20349 filed on Jan. 28, 1999 and No. Hei-11-210819 filed on Jul. 26, 1999, the contents of which are incorporated herein by reference.

BACKGROUND OF THE INVENTION

1. Field of the Invention

The present invention relates to an apparatus for determining appropriate series of words by selecting those from among candidate series of words delivered from a device that recognizes words inputted from outside in a form such as spoken voice.

2. Description of Related Art

Voice recognition systems in which words included in spoken voice are compared with words contained in an installed dictionary and the words that highly accord with the dictionary are output in a form of a series of words are known hitherto. This kind of system has been used as an apparatus for controlling various devices by means of machine-recognized spoken voice. For example, a user of an on-board navigation system gives a command to the system by his voice, and the system automatically searches and displays desired information based on the command recognized by the system.

In the conventional voice recognizing systems, two methods are generally used, that is, a continuous word recognition method and a word spotting method. Each word contained in user's voice, e.g., "Okazaki, a restaurant X, ramen," can be recognized by the machine, however, a certain mis-recognition cannot be avoided. The conventional navigation system, therefore, generates plural candidate results of recognition and talks back to the user one of the recognition results for which user's confirmation is required. The user rejects the talked-back words if those are different from what he spoke. Then, the system presents another candidate and asks for his confirmation. This process is repeated until the correct words are presented to the user. This is time consuming, and it may take a long time before a correct recognition result is finally shown to the user.

On the other hand, the word spotting method has a certain advantage. For example, informally spoken words, such as "Well . . . , I wanna eat ramen at X (name of a restaurant) in Okazaki." can be analyzed, and keywords such as "Okazaki," "X," "ramen" and "eat" can be picked up. For this reason, the word spotting method is rapidly attracting attention recently in the voice recognition field. However, this method generates a number of candidate series of words, which is called a lattice consisting of a group of words including time-related information and probability information, and it is rare that a small number of meaningful candidates are presented. The number of words that can be recognized in the word spotting method at present is about 100, but it is expected to be increased to more than 1000 in the near future. As a result, the number of candidate series of words generated from the lattice-will be increased to a much larger number. Therefore, there is the same problem as in the continuous word recognition method. The problem resulting from too many candidates may be more serious in the word spotting method than in the continuous word recognition method.

The problem mentioned above exists not only in the voice recognition but also in written character recognition and in image recognition. Input data in any form are compared with the data contained in a memory, and the data which highly accord with the data in the memory are selected as candidate results. If the number of candidates are too many, including inappropriate candidates, it takes a long time to finally reach a correct result. Moreover, it is difficult to return the conventional system to a normal operating mode when a serious error occurs in the system due to various reason such as input noises or circumstance changes. For example, if a user inadvertently speaks a name of a station even though he intends to input a name of a place, the system enters a mode for selecting a station name and does not react any more to newly input place names. It is preferable, on the one hand, to reduce the number of candidate recognition results by conferring with a dictionary, but there is a possibility, on the other hand, that the system does not return to a desired mode once it enters into other modes. If the system enters into an undesired mode and the user does not know how to escape therefrom, he or she is trapped in a serious trouble.

SUMMARY OF THE INVENTION

The present invention has been made in view of the above-mentioned problem, and an object of the present invention is to provide an improved apparatus for selecting and determining appropriate series of words. Another object of the present invention is to provide a system that can easily return to a desired mode even if the system once enters into an undesired mode.

A system, or an apparatus according to the present invention recognizes and determines an appropriate series of word based on user's voice inputted to the system. A user's utterance including a series of words is fed to a voice recognition device, and then plural candidate series of words are generated in the system. A few appropriate series of words are selected from the plural candidates based on verification as to whether the candidates are statistically appropriate as a natural language. In other words, plural candidate series of words are filtered through the system so that only a few (e.g., three or less) appropriate ones are shown to the user for his/her final confirmation.

The appropriateness of a series of words is evaluated based on various factors including grammar, meaning, a common sense, user's personal information, a sentence structure, likelihood values attached to each word and the series of words, situations surrounding the user, and so on. Among those factors, evaluation based on scores given in sentence structure tables plays an important role. All possible orders of words included in a series of words are listed in the sentence structure tables, and an evaluation score is given to each order of words. Series of words having a higher score than a predetermined level are selected as appropriate ones.

To determine the appropriate series of words, present invention also provides various processes. One is progressive searching, in which a few candidate words corresponding to a first word inputted are generated in the system, referring to a recognition dictionary. Then, the user of the system selects a proper word from the candidates, and the system dynamically restructures the recognition dictionary so that it only includes words relating to the selected word.

This process is repeated until a whole series of words inputted is all recognized and determined. It is also possible to show the user the candidate words only when the next word is not fed within a predetermined period of time.

Another is multi-stage processing in which a dialogue topic or a user's request is first determined, with reference to the recognition dictionary, from the series of words inputted. Then, the recognition dictionary is restructured so that it only includes words relating to the determined dialogue topic. The restructured dictionary is used for generating candidate words corresponding a word included in the series of words. In restructuring the recognition dictionary, various factors are taken into consideration. Those factors include networks among words and dialogue topics, continuity of a dialogue context, situations surrounding the user, and so on.

Although recognition errors are minimized in the processes of the present invention, it is also important to properly handle errors if such occur. When a erroneous recognition result is shown to the user, he/she responds to the system by uttering negating words such as "It's wrong." Then, the system provides some alternatives, such as entering a help mode, inquiring a user's answer, showing multiple-choices, or initializing the system. Thus, the situation where the user is trapped in the trouble caused by mis-recognition is avoided.

The present invention is also applicable to other systems than the voice recognition system. For example, a series of hand-written words or picture images such as a finger language converted into a series of words are, also able to be processed in the apparatus of the present invention.

According to the present invention, only a few appropriate series of words are selected from among many candidates based on proper screening processes including restructuring the recognition dictionary. Therefore, recognition errors are minimized, and time required to determine a correct series of words is shortened.

BRIEF DESCRIPTION OF THE DRAWINGS

FIG. 6 is a table showing structures of a sentence using four word elements for searching a restaurant;

FIG. 7 is a table showing structures of a sentence using three word elements for searching a restaurant;

FIG. 8 is a table showing structures of a sentence using two word elements for searching a restaurant;

FIG. 9 is a table showing structures of a sentence using one word element for searching a restaurant;

FIG. 19 is a table showing possible dialogue units each consisting of an utterance and a response;

DETAILED DESCRIPTION OF THE PREFERRED EMBODIMENT

First Embodiment

Figure 1:
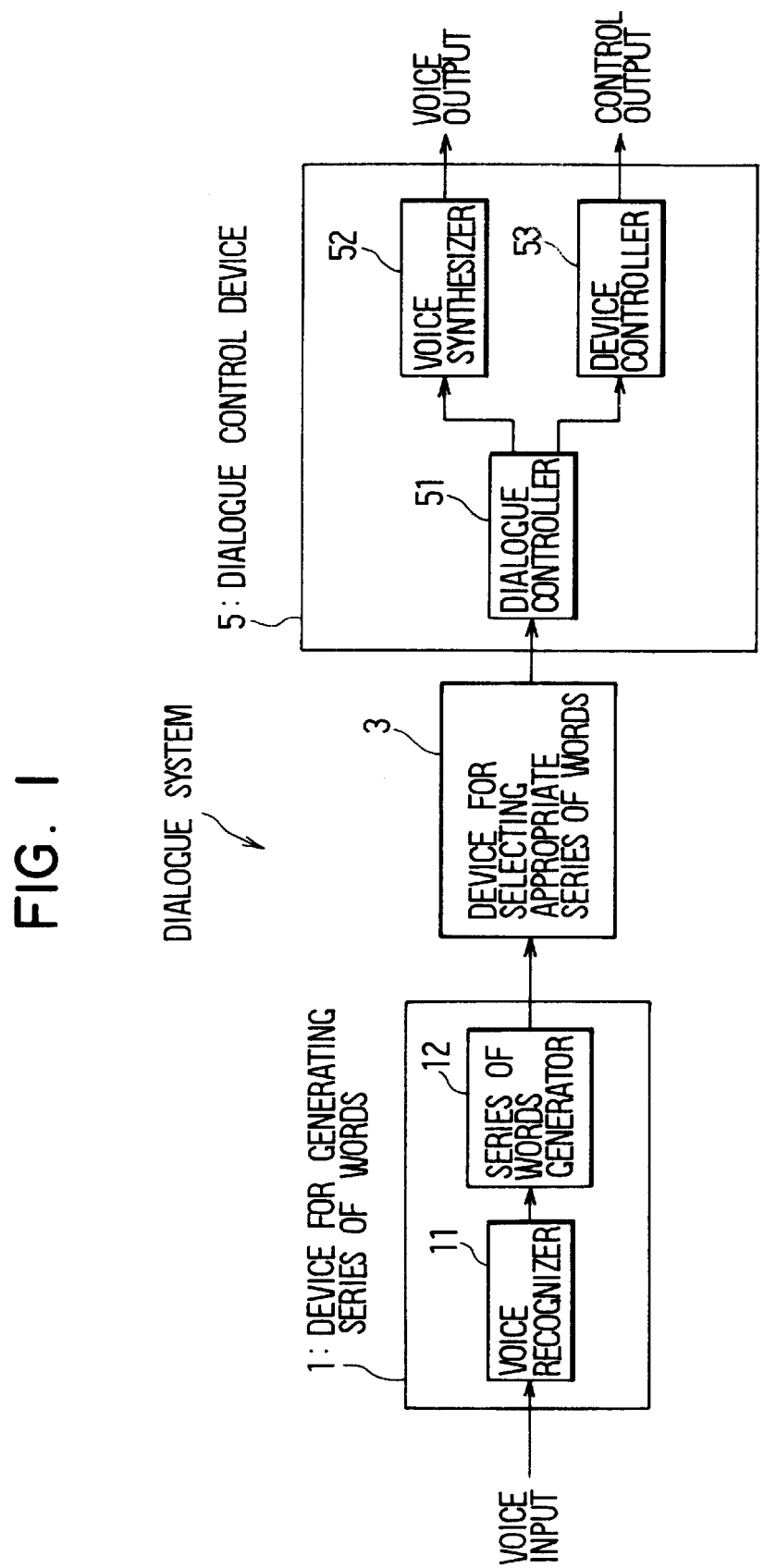
FIG. 1 is a block diagram showing a concept of a voice dialogue system.

A first embodiment of the present invention will be described with reference to FIGS. 1–10. First referring to FIG. 1, a whole conceptual structure of a voice dialogue system will be, explained. The system includes a device 1 for generating candidate series of words, a device 3 for selecting appropriate series of words from the candidates, and a dialogue control device 5. The generating device 1 includes a voice recognizer 11 and a series of words generator 12. Voice data are fed to the voice recognizer 11 where the input voice is processed to output a group of words that correspond to words registered in a dictionary. The group of words which may includes a plural words at a given time is fed to the generator 12. The generator 12 generates plural series of words as candidates so that there are no words overlapped at a given time. Then the candidate series of words are fed to the selecting device 3.

The selecting device 3 checks the plural candidate series of words as to whether those candidates are statistically appropriate as a natural language and selects a few (usually one to three) most appropriate series of words from the candidates. The selected series of words are fed to the dialogue control device 5. The process performed in the selecting device 3 will be explained later in detail. The dialogue control device 5 includes a dialogue controller 51 that controls dialogue on a text base, a voice synthesizer 52, and a device controller 53. The dialogue control device 5 delivers the voice outputs synthesized based on the series of words fed from the selecting device 3 or generates outputs for controlling other devices connected to the system based on the series of words fed from the selecting device 3.

Figure 2:
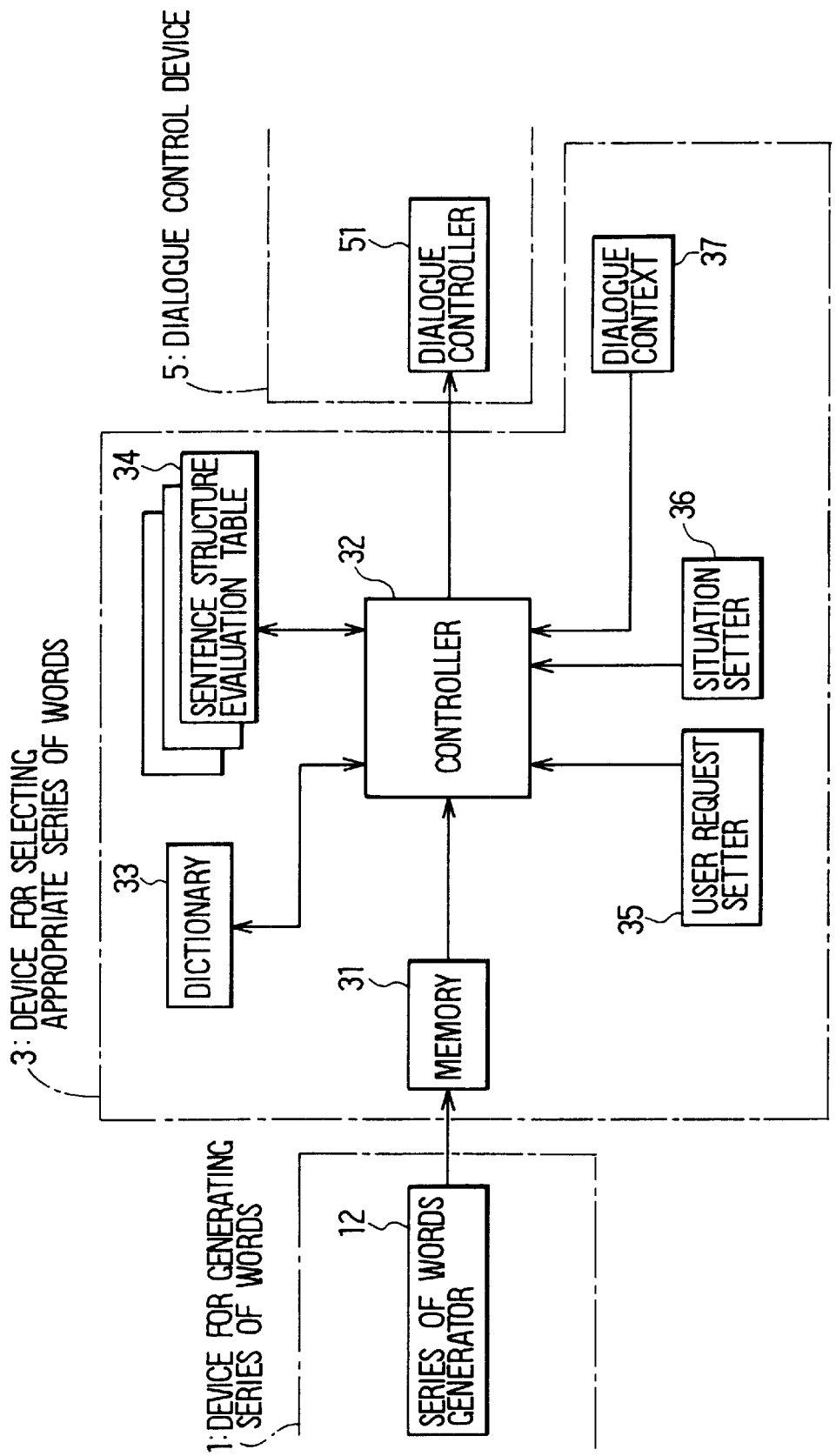
FIG. 2 is a block diagram showing an apparatus for determining appropriate series of words as a first embodiment of the present invention.

The dialogue control system operates in the manner as outlined above. The device 3 for selecting appropriate series of words, which includes the most important features of the present invention, will be described below. FIG. 2 shows the structure of the selecting device 3 in a form of functional blocks. The plural candidates of series of words generated in the generator 12 together with information associated thereto are fed to a memory 31 and stored therein. Data stored in a vocabulary dictionary 33 and sentence structure evaluation tables 34 are also fed to the controller 32. In addition, information from a user request setter 35, a situation setter 36 and a dialog context 37 are all fed to the controller 32. The controller 32 selects a few (about 3) appropriate series of words from among the plural candidates of series of words fed from the memory 31, based on all the data and information supplied thereto. Then, the selected series of words are fed to the dialogue controller 51.

Figure 3:
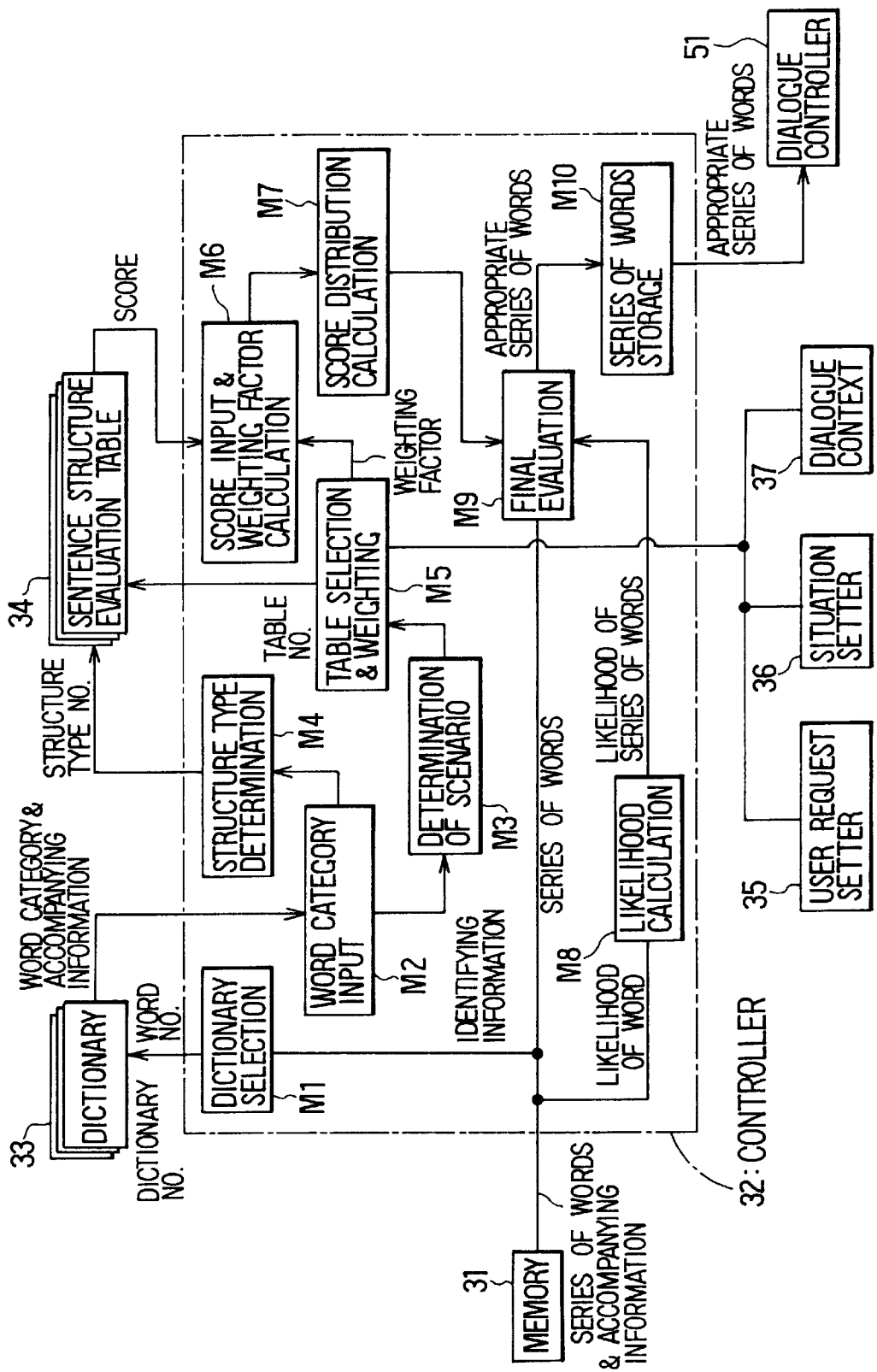
FIG. 3 is a block diagram showing functions of a controller used in the apparatus shown in FIG. 2.

Details of the controller 32 are shown in FIG. 3 in a form of function blocks. The processes performed in function blocks M1–M10 will be explained. Plural candidates of series of words and associated information are fed from the memory 31 to the controller 32. The associated information includes signals for identifying nature of the data as to whether they are commands or data, other signals showing categories of words (e.g., a name of place, a name of restaurant, or the like), addresses of the memory region and likelihood of the candidate words. The device 1 for generating series of words generates candidate series of words based on the voice input, and at the same time it calculates the likelihood showing a probability of recognition correctness for each generated candidate word. Based on the associated signals, a word dictionary 33 is selected. (M1) The selected dictionary is searched to find a word corresponding to each candidate word, and a category of the word is determined and inputted. (M2) The category includes a scenario category such as a name of station, restaurant, park, department store or the like and a request category showing user's demands (e.g., want to eat, want to shop or the like). Based on the category of words and the associated information, a name of scenario and a type of sentence structure are determined. (M3 and M4). The determined type of sentence structure is used to search sentence structure evaluation tables 34, and the determined scenario is used for selecting and weighting sentence structure evaluation tables. (M5) In selecting and weighting sentence structure evaluation tables, user's request set at 35, circumstances or situations set at 36 and context information supplied from 37 are also used in addition to the determined scenario. The details of function M5 and a method of forming the sentence structure evaluation tables will be described later.

Scores corresponding to the determined scenario and the sentence structure type are inputted. (M6) A distribution of the scores given to each series of words is calculated, and series of words that have scores higher than a predetermined level and a significant difference from others are picked up. (M7) The likelihood for each series of words supplied from the memory 31 is calculated based on the likelihood of an individual word included in the series of words. (M8) A few (three or less) series of words are selected by finally evaluating the candidates supplied from M7 based on the likelihood of the series of words. (M9) That is, three or less series of words having a likelihood higher than a predetermined level are finally selected and stored in a buffer as appropriate series of words. (M10) Those appropriate series of words are fed to the dialogue controller 51.

In M7, if it is apparently judged that there are series of words having a high score from the distribution, those series of words can be picked up. This means that the sentence structure evaluation is properly performed. In this case, the likelihood of the series of words is considered only for confirmation in M9. In other words, if the sentence structure evaluation is properly performed, a selection priority is placed on the score of a series of words, the likelihood is used only for confirmation purpose. Thus, such a situation where a series of words having a low score is finally selected as an appropriate series of words because of its high likelihood can be avoided. On the other hand, if there are only series of words having a similar score, then the appropriate series of words have to be determined based on the likelihood.

Figure 4:
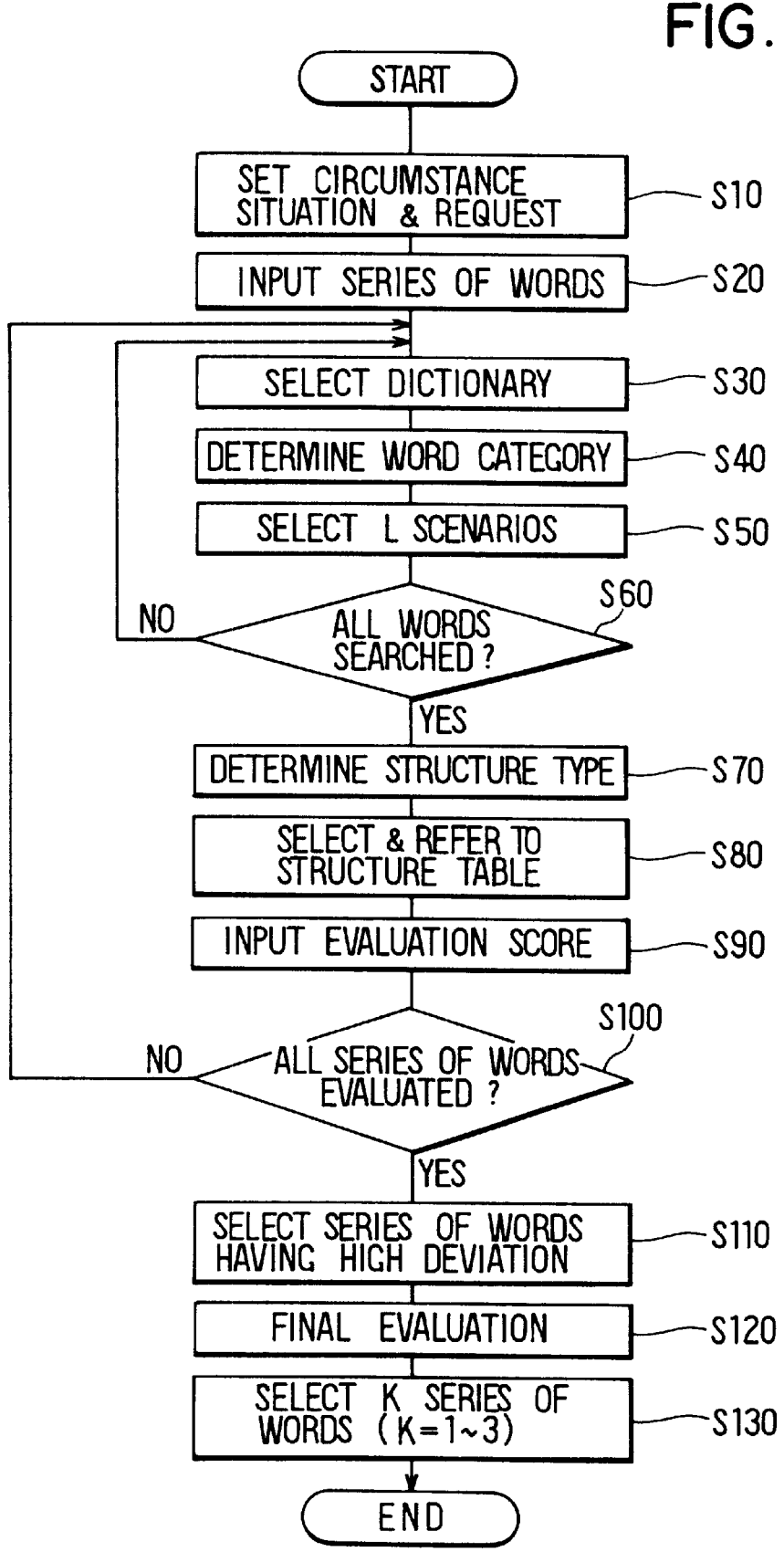
FIG. 4 is a flowchart showing a process performed by the controller.

The process performed in the controller 32 will be further explained, referring to the flowchart shown in FIG. 4. At a first step S10, the user's request and conditions (35 in FIG. 3) and the circumstance and situations surrounding the user (36 in FIG. 3) are set. Setting of these inputs may be carried out using the device described in the U.S. application Ser. No. 09/328,339 filed on Jun. 9, 1999. At step S20, plural candidates of series of words are inputted from the memory 31. At step S30, a word dictionary 33 is selected based on the identifying signals included in the information associated with the series of words. At step S40, a word category for each word is determined, and then at step S50, L pieces of corresponding scenarios are selected based on the category of words in the series of words. At step S60, whether all the words are searched or not is determined. If all the words are searched, the process proceeds to the next step S70, and if not, steps S30–S50 are repeated until all the words are searched.

At step S70, a sentence structure type is determined based on the order of categories of words. Details of this step will be described later, referring to some examples. At step S80, a sentence structure evaluation table 34 is selected, based on the scenario, the user's request, the user's conditions, the circumstance and situations, and the context information. At step S80, an evaluation score corresponding to each sentence structure type is inputted. At step S100, whether all the series of words are evaluated or not is determined. If all the series of words have been evaluated, then the process proceeds to the next step S110, and if not, steps S30–S90 are repeated until all the series of words are evaluated.

At step S110, the distribution of the evaluation scores is analyzed, and series of words having a high deviation in the distribution are selected. At step S120, K (three or less) series of words are selected, referring to the likelihood, and those series of words selected are finally determined as the appropriate series of words.

The sentence structure evaluation table 34, its selection and weighting will be described below in detail. The evaluation tables 34 are made in subjective consideration to all permutations of word categories and pre-installed in the apparatus. This will be explained, taking an example of user's utterance requesting a navigation system to display a map showing a restaurant at which he wants to dine. Assuming that the user talks to the system: "(I) WANT TO EAT RAMEN AT X IN OKAZAKI." Ramen is a kind of noodle that is popular in Japan, X is a name of restaurant, and Okazaki is a city name. A first person subject "I" is not spoken in a usual conversation in Japanese. The words included in the user's utterance are categorized into four categories. Category A is a user's request, i.e., an element "WANT TO EAT" belongs to category A; category B is a name of dish, i.e., an element "RAMEN" belongs to category B; category C is a name of restaurant, i.e., an element "X" belongs to category C; and category D is a name of place (a city name in this particular case), i.e., an element "OKAZAKI" belongs to category D. The element belonging to one category may be replaced with other elements. For example, the request "WANT TO EAT" may be replaced with another element "HUNGRY" expressing the same request.

If all the four elements belonging to categories A, B, C and D are taken up and their sequential orders are changed, there are 24 possible permutations. Namely, they can be aligned in the order of ABCD, ABDC, ACBD, ACDB . . . DCAB, and DCBA. Those permutations are listed in FIG. 6 together with corresponding evaluation scores. Similarly, if three elements belonging to any three categories are selected from among A, B, C and D, there are also 24 possible permutations, as shown in FIG. 7. If two elements belonging to any two categories are selected, there are 12 possible permutations as shown in FIG. 8. If only one element is selected, there are four possibilities as shown in FIG. 9. Summing up all the possibilities, there are 64 permutations which are referred to as types of sentence structure.

Figure 5:
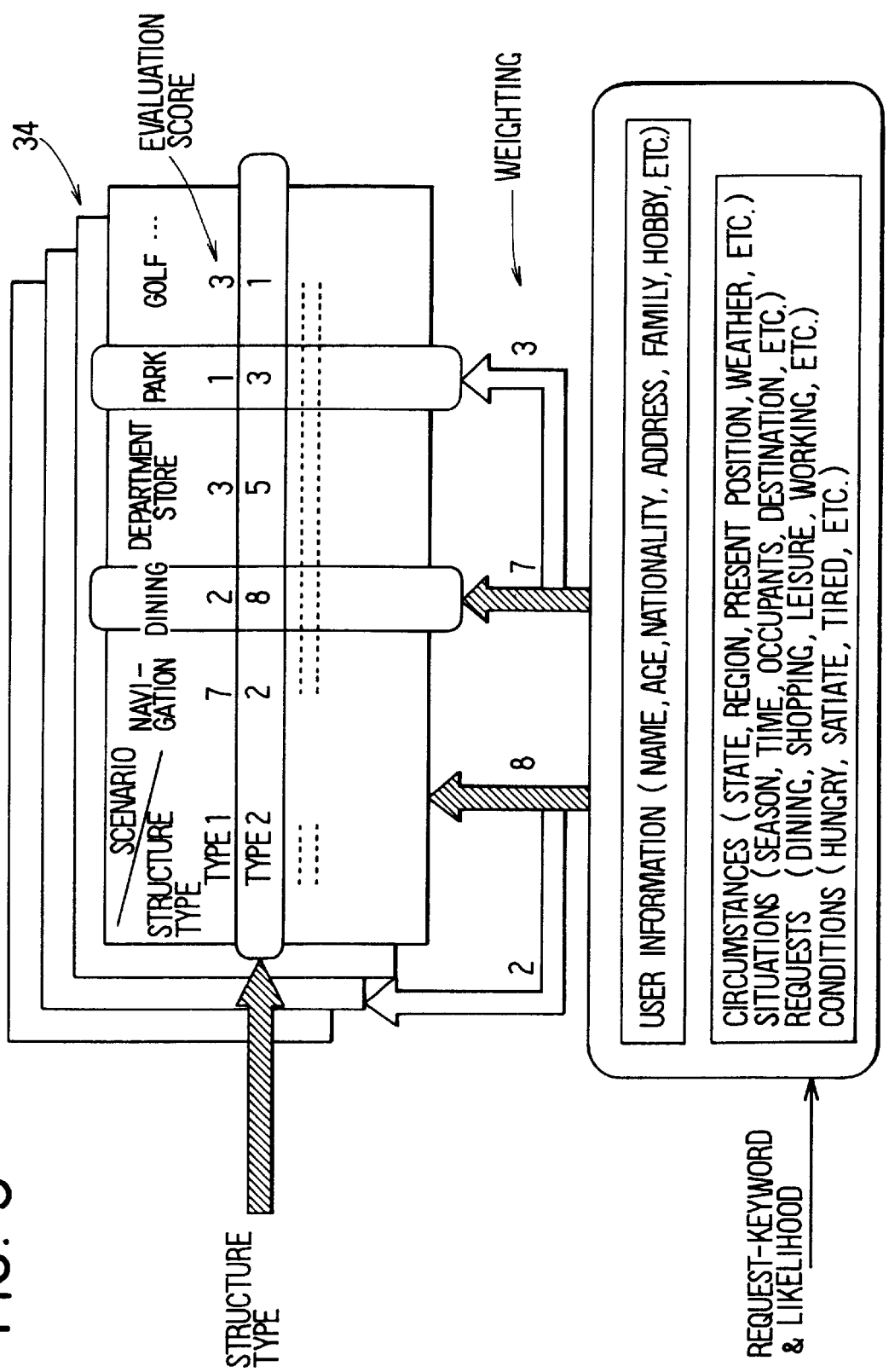
FIG. 5 is a chart showing a concept of a sentence structure evaluation table.

Some of the examples are taken up from the 64 sentence structure types. In the case of type No.5 (FIG. 6), the sentence is: "WANT TO EAT IN OKAZAKI RAMEN AT X." In the case of No.17 (FIG. 6): "AT X IN OKAZAKI WANT TO EAT RAMEN." In the case of No.32 (FIG. 7): "RAMEN WANT TO EAT IN OKAZAKI." In the case of No.46 (FIG. 7): "IN OKAZAKI RAMEN AT X." In the case of No.51 (FIG. 8): "WANT TO EAT IN OKAZAKI." In the case of No.60 (FIG. 8): "IN OKAZAKI AT X." In the case of No.62 (FIG. 9): "RAMEN." An evaluation score is given to each sentence type for each scenario such as navigating, dining, shopping, golfing or the like. In this particular example shown in FIGS. 6–9, the scenario is dining, and scores are given in four grades, 10, 7, 4 and 1, grade 10 having the highest understandability and grade 1 the lowest understandability. The cores are given subjectively by a person who makes the evaluation tables. For example, the score of type No.6 is 7, No.24 is 10, No.51 is 1, and No.63 is 4. A concept of forming the sentence structure evaluation table is shown in FIG. 5. As shown in FIG. 5, a score of a given sentence type differs from scenario to scenario. Though the scores are pre-installed in the apparatus as default values, it is preferable to provide a flexible system in which the scores can be changed by a user according to his preference, dialects or the like.

Now, referring to FIG. 5, factors used for selecting and weighting the evaluation tables will be explained. These factors are the user's request and conditions set at 35 (FIG. 3), the circumstances and situations set at 36, context information set at 37. The setting of user's request and conditions may be performed using the device disclosed in the earlier filed U.S. Application No. 09/328,339. The user's request such as "want to eat," "want to shop," "want to visit a park," etc. and the user's conditions such as "hungry," "tired," "sleepy," etc. are used for selecting the evaluation tables. Also, other user's information such as his schedule may be included in the factors used in selecting the evaluation tables. Plural tables may be selected as mentioned above, and in that case each table is weighted as shown in FIG. 5. Final scores are determined by multiplying the original scores by the weighting factor.

The selection and weighting of the evaluation tables are performed also depending on the circumstances and situations surrounding the user and/or his personal information (e.g., nationality, district, present location, season, time, weather, traffic conditions, name, age, family, hobbies, etc.). Further, the context of previous dialogue set at 37 (FIG. 3) is also used in selecting and weighting the evaluation tables. Whether the scenario determined in M3 is proper or not may be evaluated based on the context, taking into consideration continuity and relation between the present scenario and previous scenarios. Correctness in light of the context may be numerically expressed if necessary. For example, when the system talks to the user asking "Which do you prefer Japanese foods or Chinese foods?," the system expects an answer such as "Chinese foods" or "Japanese foods." In this case, if the user speaks words that have no relation to the question, it is determined that there is no continuation in the dialogue and that the scenario may not be correctly set.

Figure 10:
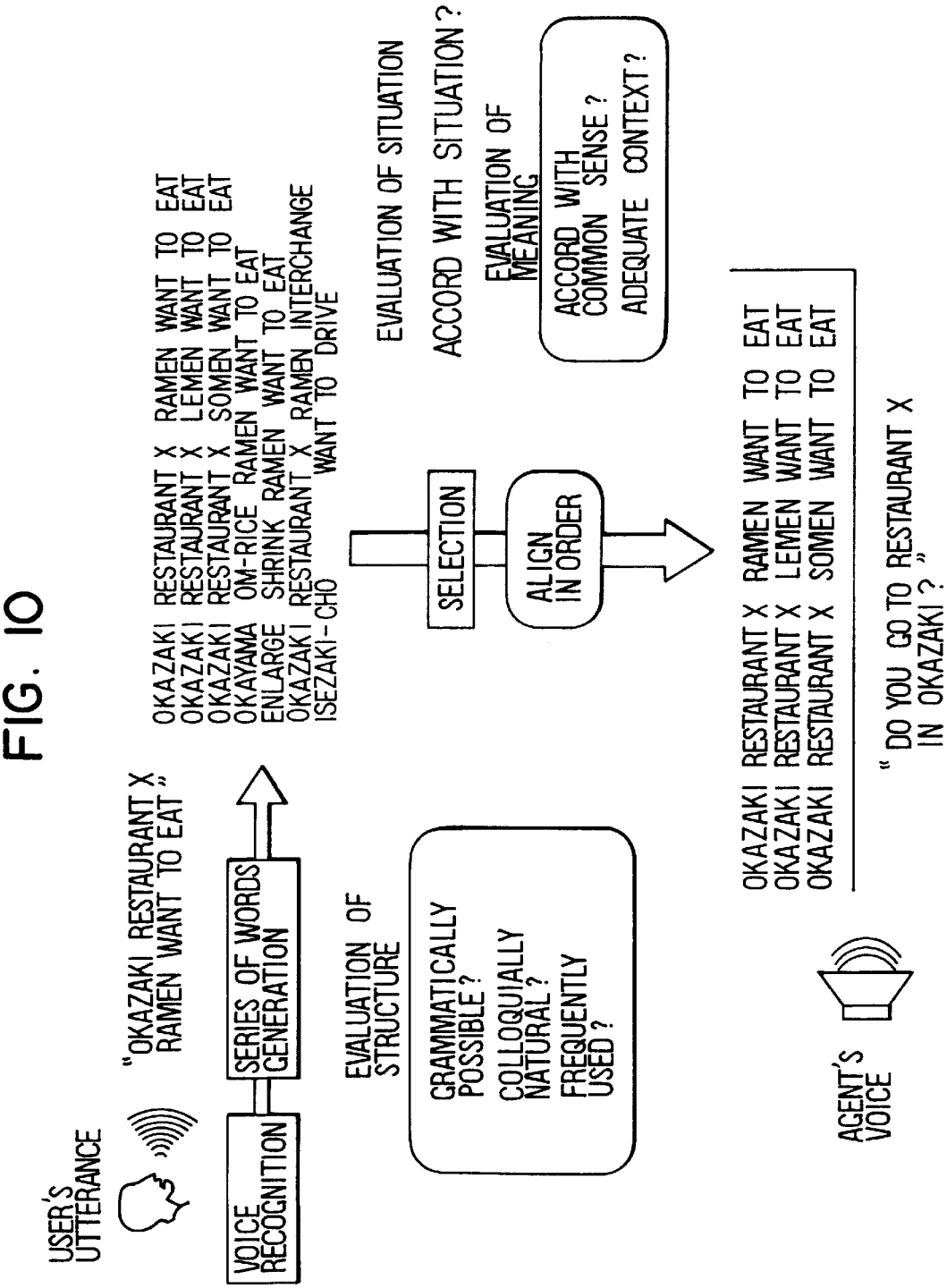
FIG. 10 is a chart showing an example of a process of determining appropriate series of words.

Referring to FIG. 10, the system of the present invention will be further explained, taking an example of a user's utterance for easier understanding. The example of the user's utterance is the same as that used in FIGS. 6–9, that is, "(I) WANT TO EAT RAMEN AT X IN OKAZAKI." It is assumed that the device 1 (FIG. 1) for generating plural candidates of series of words generates the following series of word, upon input of the user's utterance.

① WANT TO EAT RAMEN X OKAZAKI
② WANT TO EAT LEMEN X OKAZAKI
③ WANT TO EAT SOMEN X OKAZAKI
④ WANT TO EAT RAMEN OMRICE OKAYAMA
⑤ WANT TO BUY RAMEN SHRINK ENLARGE
⑥ INTERCHANGE RAMEN X OKAZAKI
⑦ WANT TO DRIVE ISEZAKICHO

Among the above candidates, ①, ② and ③ relate to a set scenario, i.e., dining at a restaurant, and therefore high scores are given to those candidates both from standpoints of meaning and a sentence structure. In other words, those candidates are statistically appropriate. As to ④, two names of foods are included, and therefore a low score is given to this candidate because it is rare and not natural. Also, since it includes a name of place, OKAYAMA, which is far from the present location of the vehicle, a low likelihood value is given. In other words, the candidate ④ is omitted based on the evaluation on circumstances. The present location of the vehicle is always detected by the navigation system. Candidate ⑤ includes navigation commands, ENLARGE and SHRINK in addition to the request WANT TO EAT, it is omitted because it is not a possible combination. As to candidate ⑥, it includes RAMEN that is an object of request WANT TO EAT in addition to INTERCHANGE that relates to a navigation command. Therefore, it is also omitted. The likelihood value of candidate ⑦ becomes low if the name of place, ISEZAKICHO, is not included in Aichi prefecture in which the vehicle is now being driven. if a destination is preset, a weighting factor of DRIVE becomes low in selecting the evaluation table and the scenario.

At the final evaluation stage M9 (FIG. 3), ①, ② and ③ are selected through the above processes as three appropriate series of words, and those are stored in the buffer (M10 in FIG. 3) and supplied to the dialogue controller 51. Then, the system talks back to the user contents of three appropriate series of words one by one for user's confirmation. In this particular example, since the series of words ① is correctly represents the user's initial input, the user confirms his intention by affirming the first talk-back. Then, the system may speak to the user "DO YOU GO TO X IN OKAZAKI?" for reconfirmation. Even if the system talks back those series of words in a different order, for example, ②→③→①, the user's intention can be confirmed by denying two times. If all the seven candidates are talked back without selecting the appropriate ones, the user's intention is finally confirmed by denying the talk-backs six times at the worst case. Thus, the apparatus of the present invention enhances user's convenience.

The operation of the first embodiment described above will be summarized as follows. The selecting device 3 determines the appropriate series of words to be talked back to the user by selecting those from among the candidates supplied from the generating device 1. In other words, the candidates of series of words are filtered by the selecting device 3, based on the evaluation as to whether the candidates are statistically appropriate as a natural language. The candidates of series of words that are nonsense in light of the user's request, the present situation, the dialogue context and the like are filtered out and omitted from the candidates. Further, if such information that restaurant X serves Chinese foods such as ramen or gioza is installed in the system, the candidate ① can be first talked back. If there is information that the present season is winter, and lemen or somen is not served in winter, the candidates ② and ③ can be automatically eliminated. These additional information-may be included in the word dictionary 33 or may be supplied by searching a data base through the dialogue control device 5.

The present invention is not limited to the embodiment described above, but may be variously modified. For example, in place of the voice input fed to the system, image data such as series of hand-written words may be fed to the system. In this case, the system looks up the word dictionary in generating candidates of series of words and selects a few appropriate series of hand-written words from among the candidates in the same manner as in the first embodiment. The input fed to the system may be other image data such as image patterns of a finger language, which is not in a form of a series of words. In this case, the system converts the patterns into a series of words, and then generates candidates of series of words. A few number of appropriate series of words are selected from among the candidates in the same manner as described above. Since a few number of series of words are selected from a relatively large number of candidates in any application, the input data fed to the system are effectively recognized.

Second Embodiment

Figure 11:
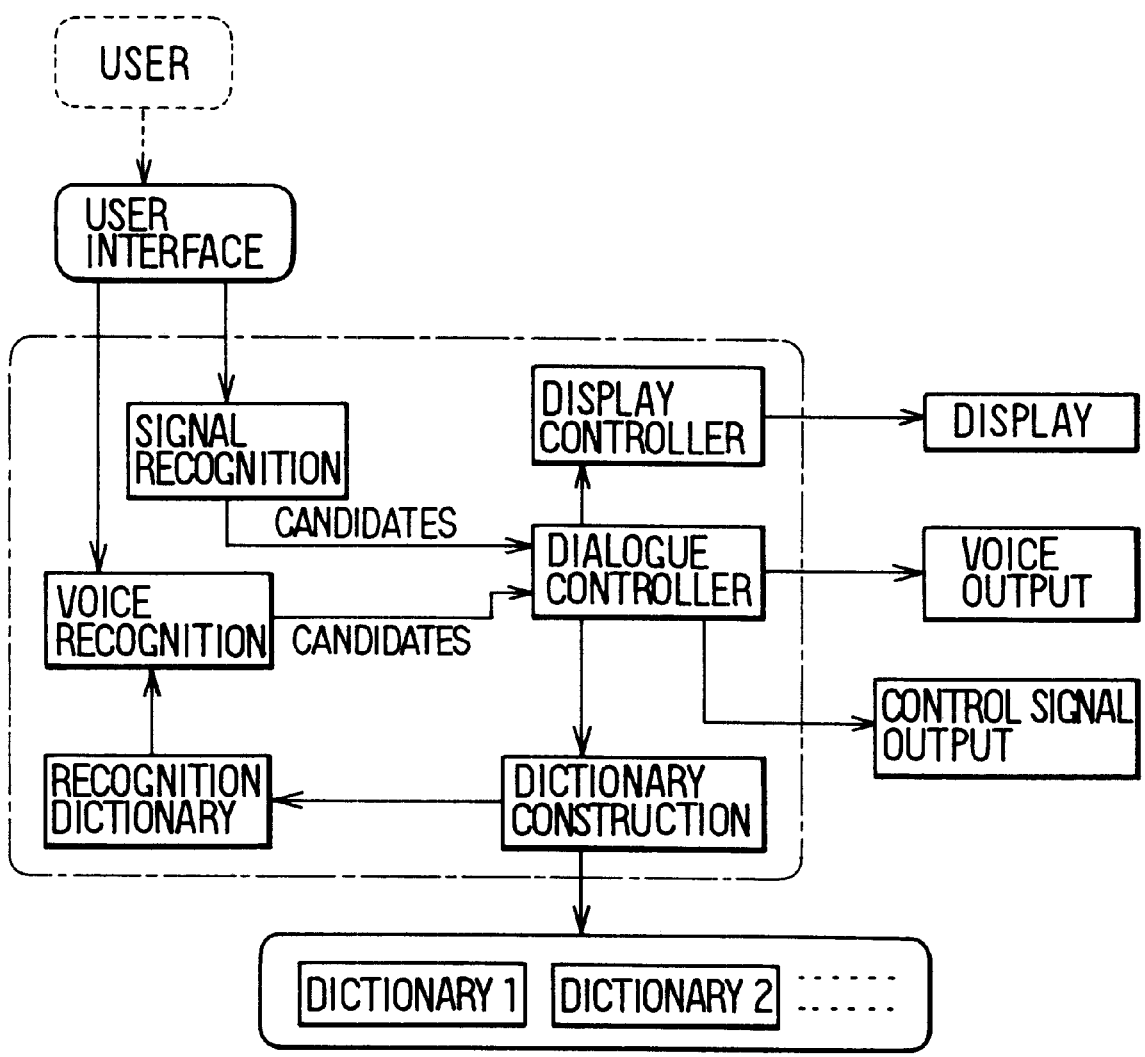
FIG. 11 is a block diagram showing an operational concept of an apparatus for determining series of words.

Referring to FIG. 11, an overall concept of a system for recognizing series of words will be described. User's voice fed to the system through an interface is processed by a voice recognition portion and a signal recognition portion, and candidates of series of words are generated. The voice recognition portion recognizes a user's utterance by constituting a word dictionary and generates plural candidates of series of words. In case plural words are overlapped in a given time period, such overlapping is eliminated by generating the plural candidates of series of words. A likelihood value representing probability of recognition correctness is attached to each recognized word.

The plural series of words accompanied by likelihood values are fed to a dialogue controller. The dialogue controller recognizes the series of words with the likelihood information by using other information such as dialogue context and scenario, and automatically restructures the recognition dictionary through a dictionary constructing portion. The dictionary constructing portion communicates with plural dictionaries, dictionary 1, dictionary 2 and so on. The dialogue controller also controls a display system through a display controller, voice outputs and signals for controlling other devices.

Figure 12:
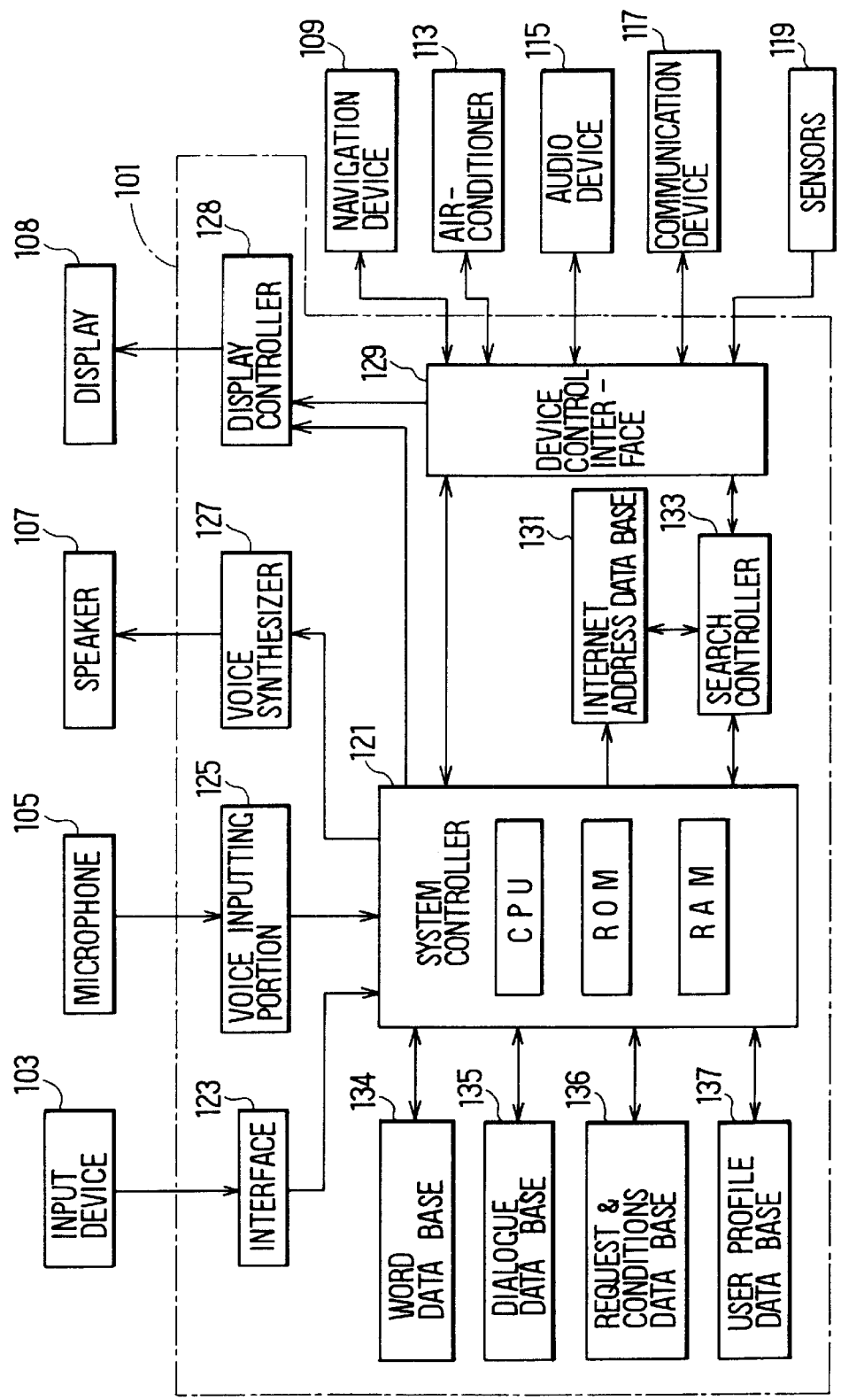
FIG. 12 is a block diagram showing the apparatus for determining series of words as a second embodiment of the present invention, the apparatus being adapted to an on-board system.

FIG. 12 is a block diagram showing a whole structure of the series of words recognition system which is applied to a control system for an automotive vehicle. A user of the system communicates with the system by means of his voice and controls on-board devices through the system or commands the system to give him required information. The system is composed of: a controller 101; an input device 103 through which the user inputs various data and commands; a microphone 105 through which voice inputs are fed; a speaker 107 that delivers synthesized voice; a display 108 for displaying images thereon; a navigation device 109 for detecting a present location of the vehicle and navigating a driver; an air-conditioner 113; an audio device 115 including a cassette tape recorder, a compact disc player, a mini-disc player, a radio, a television and the like; a communication device 117 including a VICS (a Vehicle Information and Communication System) terminal, an internet wireless terminal and the like; various sensors 119 including a vehicle speed sensor, an acceleration sensor, a temperature sensor, a rain sensor and so on; and various controllers (not shown) for controlling operation of a door lock device, power windows, an engine, brakes and so on.

The navigation device 109 includes a GPS system; a CD-ROM storing map data, data bases for place names, facility names and other information necessary for navigation; a CD-ROM drive for retrieving information from the CD-ROM; and a key board for inputting user's commands. When the user inputs his destination, the navigation device displays a route guidance map on its display screen. In addition, other information required by the user and television images are displayed on the screen.

The controller 101 includes: a system controller 121 mainly consisting of a microcomputer including CPU, ROM and RAM; an interface 123 for feeding data and commands from the input device 103 to the system controller 121; a voice inputting portion 125 for inputting digital signals converted from voice inputs to the system controller 121; a voice synthesizer 127 for converting text data supplied from the system controller 121 to analog voice signals and for feeding the analog voice signals to the speaker 107; a display controller 128 for controlling images to be displayed on the display device 108; and a device control interface 129 for communicating with aforementioned devices 109, 113, 115, 117, and 119.

The controller 101 also includes an internet address data base 131 for searching required information through the internet and a search controller 133. When the system controller 121 supplies a keyword for searching required information to the search controller 133, the search controller 133 operates the communication device 117 through the device control interface 129 to search information corresponding to the keyword and to feed the search results to the system controller 121. Internet addresses previously used by the search controller 133 are stored in the internet address data base 131 based on instructions from the system controller 121. When the same keyword for searching as the one previously fed is supplied to the search controller 133 from the system controller 121, the search controller 133 again uses the internet address corresponding to the keyword and stored in the internet data base 131.

The controller 101 further includes a word data base 134, a dialogue data base 135, a data base 136 for user's requests and conditions and a data base 137 storing a user's profile, all the data bases communicating with the system controller 121. The word data base 134 contains a vocabulary consisting of words expected to be spoken by the user and to be recognized by the system. The dialogue data base 135 stores utterances of the user and words generated and spoken by the system (referred to as agent utterances in some occasions in the following description). The dialogue data base 135 and the data base 136 are utilized to efficiently estimate the user's requests and his mental and physical conditions from his actual utterances. The data base 137 stores personal information of several users who are expected to frequently use the system. The dialogue data base 135, the data base 136 for user's requests and conditions, the user profile data base 137 and the internet address data base 131 are composed of non-volatile memories that are able to be written and read. As to the data stored in the data bases 135, 136 and 137, an earlier filed U.S. application Ser. No. 09/328,339 (filed on Jun. 9, 1999) discloses some more details.

Figure 13:
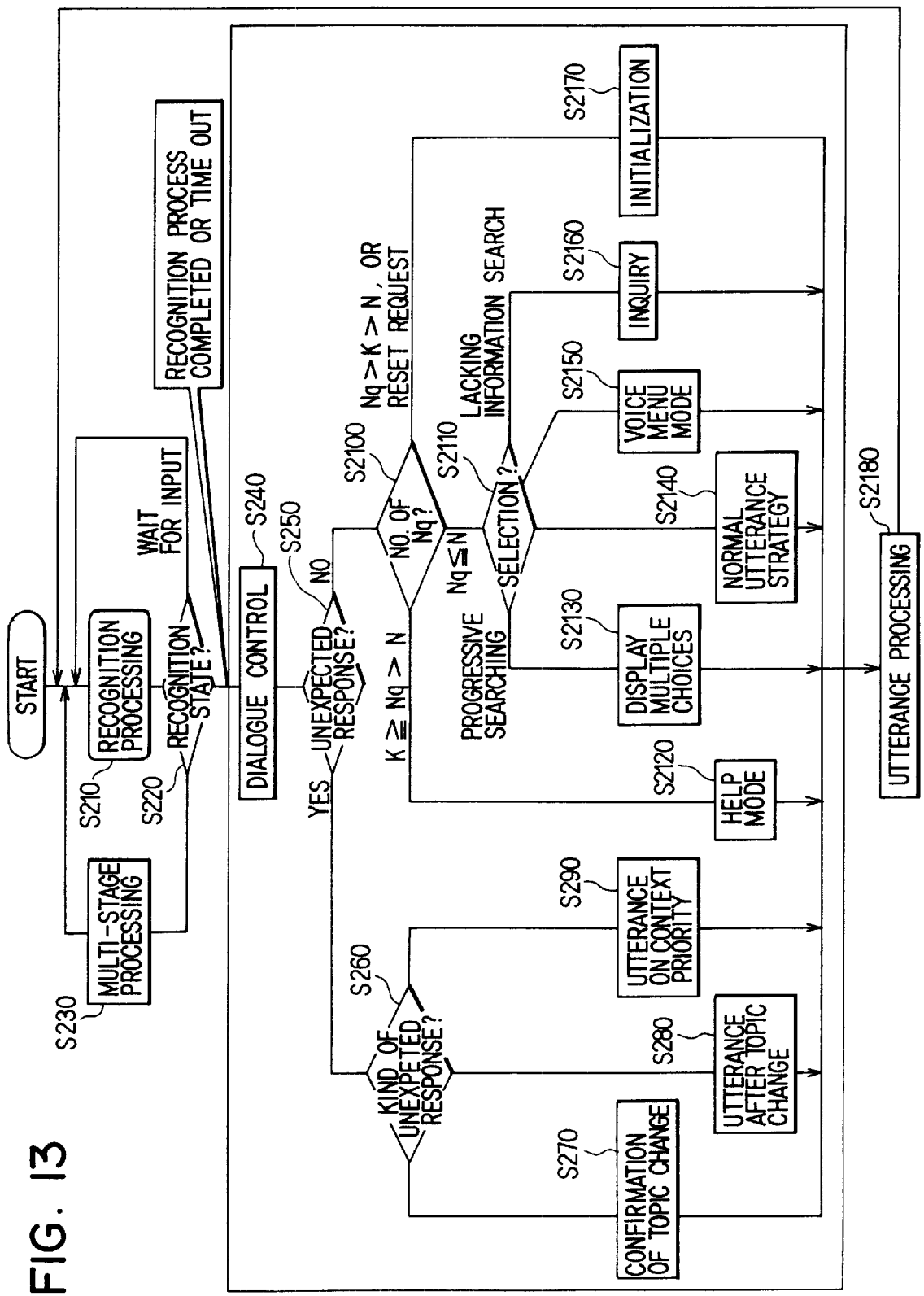
FIG. 13 is a block diagram showing a system controller used in the apparatus shown in FIG. 12.

Referring to the flowchart shown in FIG. 13, an outline of the process performed in the system controller 121 will be described. At step S210, user's voice fed from the voice inputting portion 125 (FIG. 12) is processed to generate plural candidates of series of words in the manner described above. At step S220, the state of voice recognition is determined. That is, if the system is waiting for inputs, the process returns to step S210; if the multi-stage processing is required, the process moves to step S230 (the process in this step will be described later in detail); and if the recognition process has been completed, the process moves to the dialogue control stage (step S240). Then, at step S250, whether a response is unexpected one or not is determined. If the response is unexpected one, the process moves to step S260, and if not, the process moves to step S2100. At step S260, kinds of the unexpected response are determined. According to the determination at step S260, the process moves to either step S270, S280 or S290. A confirmation of the dialogue topic (or subject) change, an utterance after the subject change and an utterance based on the context are carried out at steps S270, S280 and S290, respectively. Then, the process returns to step S210 through utterance processing step S2180.

On the other hand, if it is determined at step S250 that the response is an expected one, the process moves to step S2100. At step S2100, whether the number of inquiries Nq from the agent (the function concerning the dialogue control in the system is referred to as the agent) exceeds a predetermined number N or another predetermined number K (K>N) is determined. If Nq is larger than N and equal to or less than K (K≧Nq>N), the process moves to a help mode (S2120). If Nq is larger than K (Nq>K>N), or if a reset is requested by the user, the process moves to an initialization step (S2170). If Nq is equal to or smaller than N (Nq≦N), the process moves to step S2110. At step S2110, one operational mode is selected from among four modes, i.e., displaying multiple choices on the screen (step S2130), a normal utterance strategy (step S2140), a voice menu mode (step S2150) and an inquiry mode (step S2160). Details of these steps will be described later. Upon completion of either one of the steps S2120–S2170, the process returns to step S210 through utterance processing step S2180.

Further details of the process outlined above will be described below. Since the dialogue control of the present invention includes "progressive searching," "multi-stage processing," "unexpected situation processing," and "error handling," the following explanation will be made for each of these processes with reference to respective examples. However, since the unexpected situation processing and the error handling are closely related, these two will be explained together.

1. Progressive Searching

To perform the progressive searching, the system has to be set to this mode, because each word included in a series of words is processed separately and the time cycle is different from other modes. In other words, when the system is set to this mode, step S2110 (FIG. 13) automatically selects step S2130 for displaying multiple choices on the screen.

Figure 14:
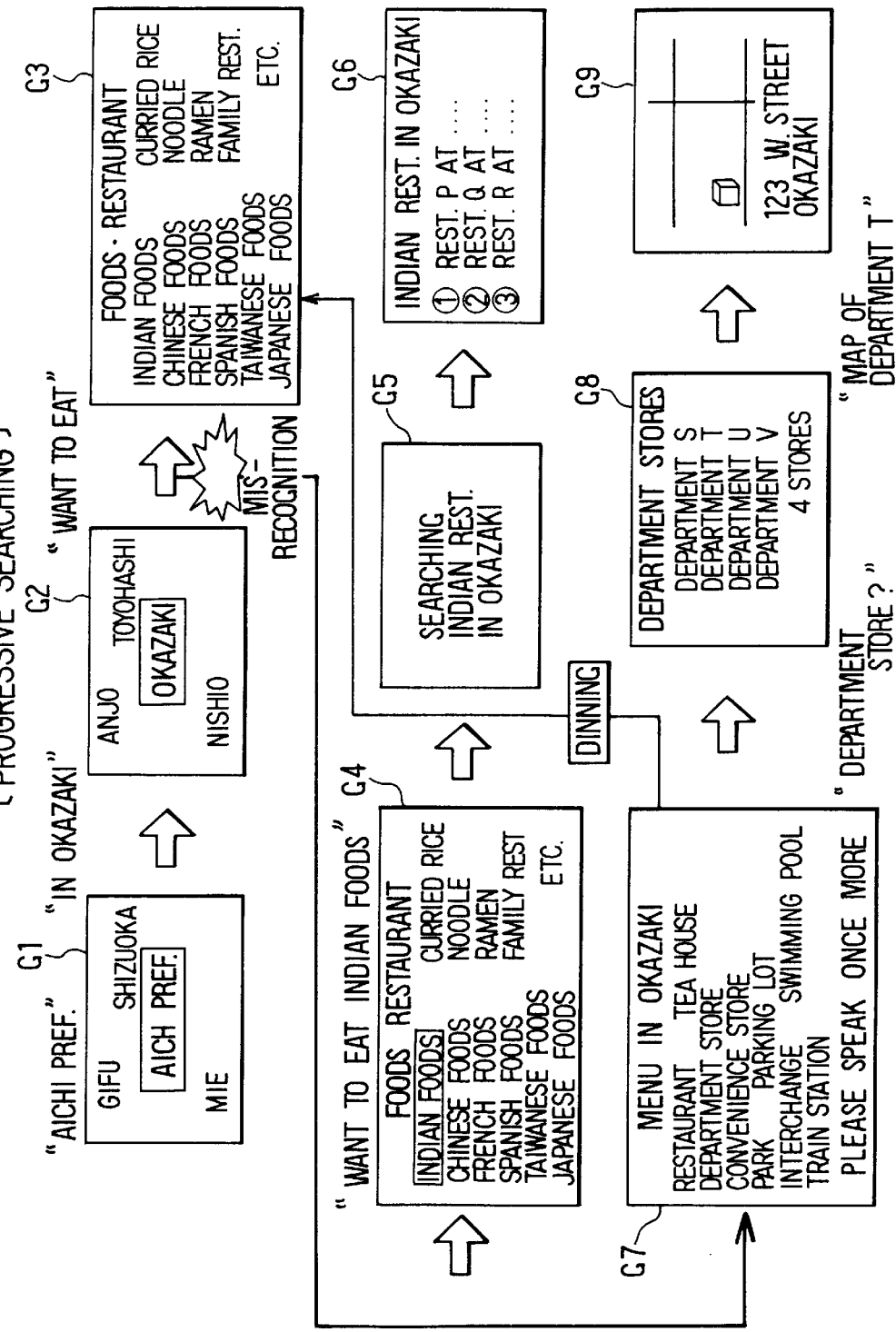
FIG. 14 is a chart showing an example processed in progressive searching.

FIG. 14 shows one example of the progressive searching. In this example a user requests the system to display a map showing a restaurant or a department store. The user's request is made by speaking to the system. A first display G1 on the screen shows four prefecture names, Aichiken, Gifu, Shizuoka and Mie, because these four prefecture names are originally set as default. When the user speaks to the system, "Aichi-ken," the system recognizes his voice and selects Aichi-ken from among four prefecture names and highlights Aichi-ken, as shown in display G1. Since the system is set to the progressive searching mode, the system automatically displays certain words which the system expects to be spoken next by the user after the first word "Aichi-ken" is recognized. In this example, four city names, Anjo, Toyohashi, Okazaki and Nishio located in Aichi-ken are displayed on the screen as shown in display G2. It is, of course, possible to display some more city names.

At this stage, when the user speaks to the system "Okazaki," the system recognizes his utterance and highlights Okazaki as shown in G2. Then, the system prepares the next display G3 that includes some words the system expects as a next word, and the display G3 is actually shown if no words are spoken for a certain period of time, e.g., one to two seconds. The reason why the system only prepares the display G3 and does not show it until a certain period of time lapses is that it is highly possible that a series of words, such as "want to eat something" (not a single word) follows the previous word "Okazaki." The display G3 shows some kinds of foods, such as French foods, Spanish foods or the like and some names of foods, such as curried rice, ramen or the like in this particular example. At the stage where G3 is displayed, if the user speaks "I prefer Indian foods," then the system shows a display G4 which highlights the Indian foods. Then, the next display G5 showing a message, "Indian foods restaurants in Okazaki, Aichi-ken are being searched." is shown on the screen. Then, a search result listing three Indian restaurants (P, Q and R) and their addresses is shown (display G6).

On the other hand, at the stage where G2 is displayed, if a word or words that are not expected are spoken, a display G7 including a menu in Okazaki and a message, "Please speak once more." is shown. At this stage, if the user speaks "dining," the display G3 is shown. If the user speaks "Department stores?" then the next display G8 showing four department stores (S, T, U and V) is displayed. Then, if the user speaks "a map of department store U," then the map of that department store U is displayed (G9).

Figure 15:
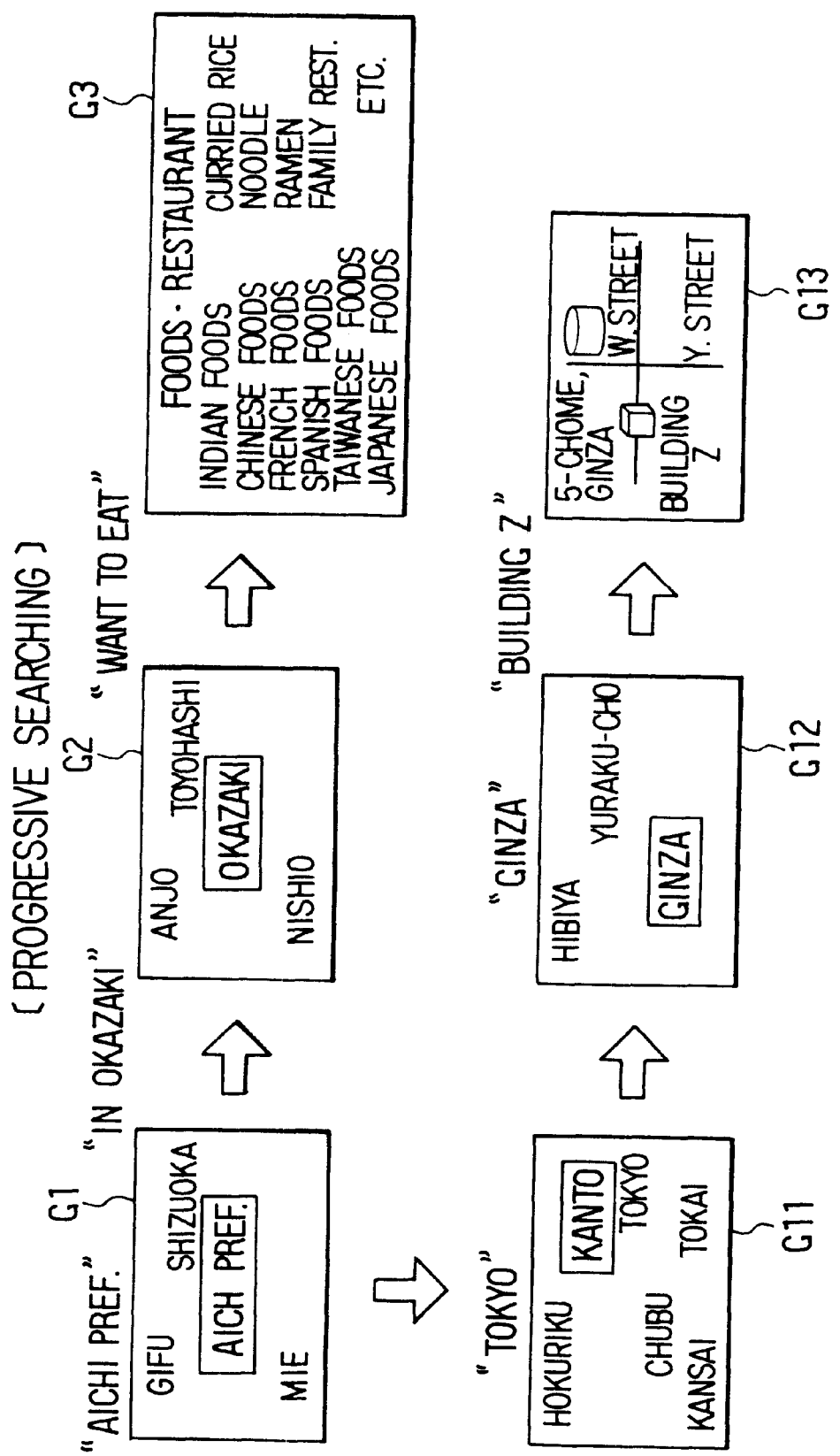
FIG. 15 is a chart showing another example processed in the progressive searching.

FIG. 15 shows another example of the progressive searching, wherein a user requests the system to show a map showing a location of a building in Ginza, Tokyo. At the stage where the display G1 (G1 is the same as that in the first example) is shown, if the user speaks "Tokyo," the display G1 is switched to a display G11 showing all the districts in Japan, and Kanto district to which Tokyo belongs is highlighted. Then the system shows a display G12 showing some location names that are expected to be spoken as a next word. If the user speaks "Ginza" at this stage, Ginza is highlighted on the display G12. The system prepares the next display showing candidate words which the system expects as next words in the same manner as in the transition stage from G2 to G3 in the first example. If the user speaks "Z building" with a pause of one to two seconds after the word "Ginza" is spoken, then the display G13 showing a location map of Z-building is displayed.

The advantage of the progressive searching described above is that requested information is quickly searched and shown to the user, avoiding mis-recognition due to the user's utterance that includes words not listed in the recognition dictionary. Taking a user utterance, "want to eat Indian foods in Okazaki," as an example, a series of words, "OKAZAKI, EAT, INDIAN FOODS," is the result of word recognition by the word spotting method. In conventional systems, dialogue processing starts only after all of the keywords, OKAZAKI, EAT and INDIAN FOODS, are recognized. In contrast, in the progressive processing of the present invention, immediately after the first keyword OKAZAKI is recognized, the system proposes to the user candidate words expected to be spoken next. Therefore, the user can select a words from the proposed candidates, thus avoiding words not included in the dictionary from being used.

2. Multi-stage Processing 2.1 Outline

About 100 words can be recognized at a time in the present word spotting method. It is difficult to drastically increase the number of words as in a dictionary used in the continuous word recognition method. On the other hand, the 100 words satisfy a practical purpose of the on-board system when a topic of dialogue, or a request of a user is properly identified and dictionaries are restructured according to the identified topic. The multi-stage processing of the present invention is effective in the on-board system.

Figure 16:
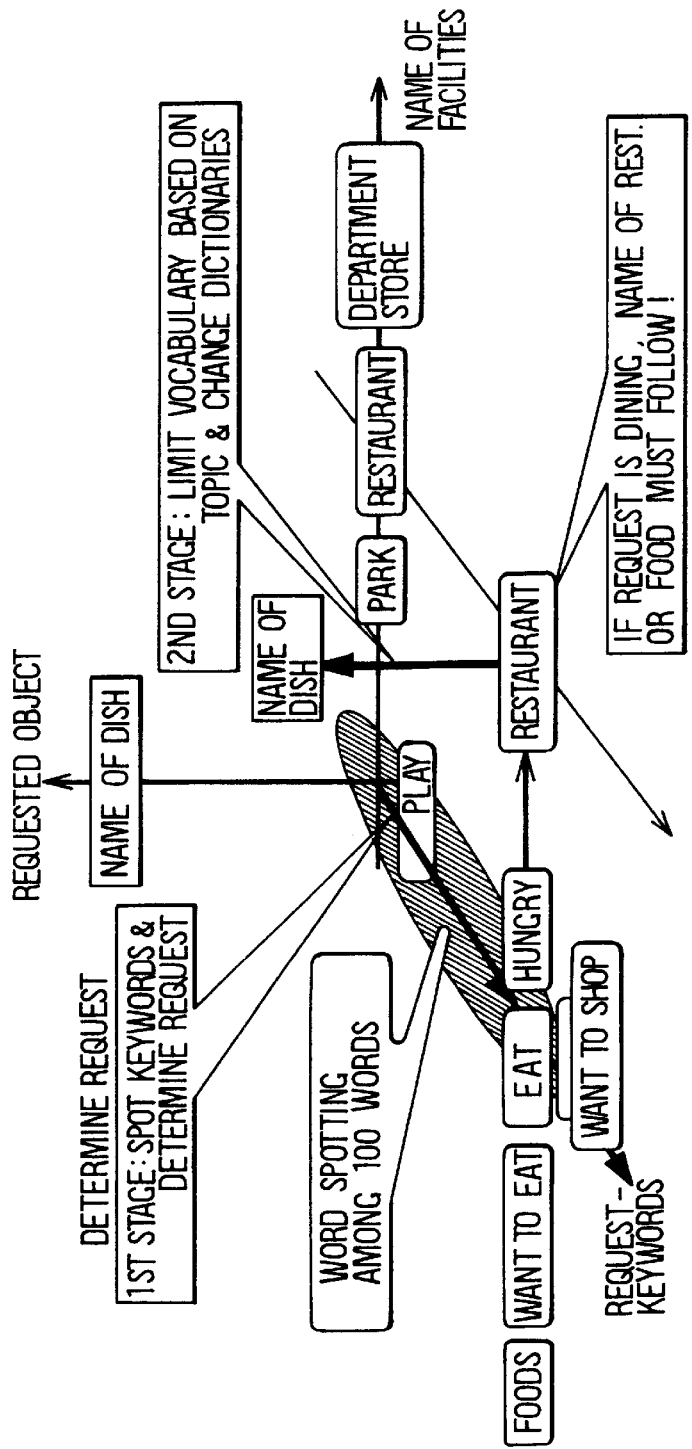
FIG. 16 is a chart showing an example processed in multi-stage processing.

Referring to FIGS. 16–21, the multi-stage processing will be described together with some examples. FIG. 16 shows an example of multi-stage processing as to a user utterance, "WANT TO EAT SHUMAI AT CHINESE QUARTER IN YOKOHAMA." The words included in the utterance are categorized in the same manner as in the first embodiment described above. That is, WANT TO EAT is a user's request (category A); SHUMAI is a name of dish (category B); AT CHINESE QUARTER is a name of place for dining (category C); and IN YOKOHAMA is a name of city (category D). To determine the user's request, keywords representing the user's request are word spotted in the first stage. Then in the second stage, a dictionary to be used is. restructured based on the identified user's request. Namely, a dictionary containing about 100 words mainly relating to restaurant names located in the neighborhood of a destination and dish names is formed. Since the user's request is first identified as WANT TO EAT, only the words relating to dining are selected and other words are eliminated. Thus, the following process can be easily performed.

It may be possible to determine a topic of the dialogue based on words belonging to other categories than the user's request, e.g., based on the city name, the dining place or the dish name. However, it is most preferable to determine the dialogue topic based on the user's request, considering the limited number of words containable in a dictionary. Though several axes are set in the chart of FIG. 16 based on categories of words, a context of the dialogue may be included in determining the topic.

2.2 Basic Structure of User Utterance

The words, or the word categories are arranged in the order of A, B, C, D in the example given above, but those may be aligned in various orders as described in the first embodiment. To cope with this problem, a plural series of words may be evaluated and scored in the same manner as in the first embodiment.

2.3 Structuring Recognition Dictionary

Figure 17:
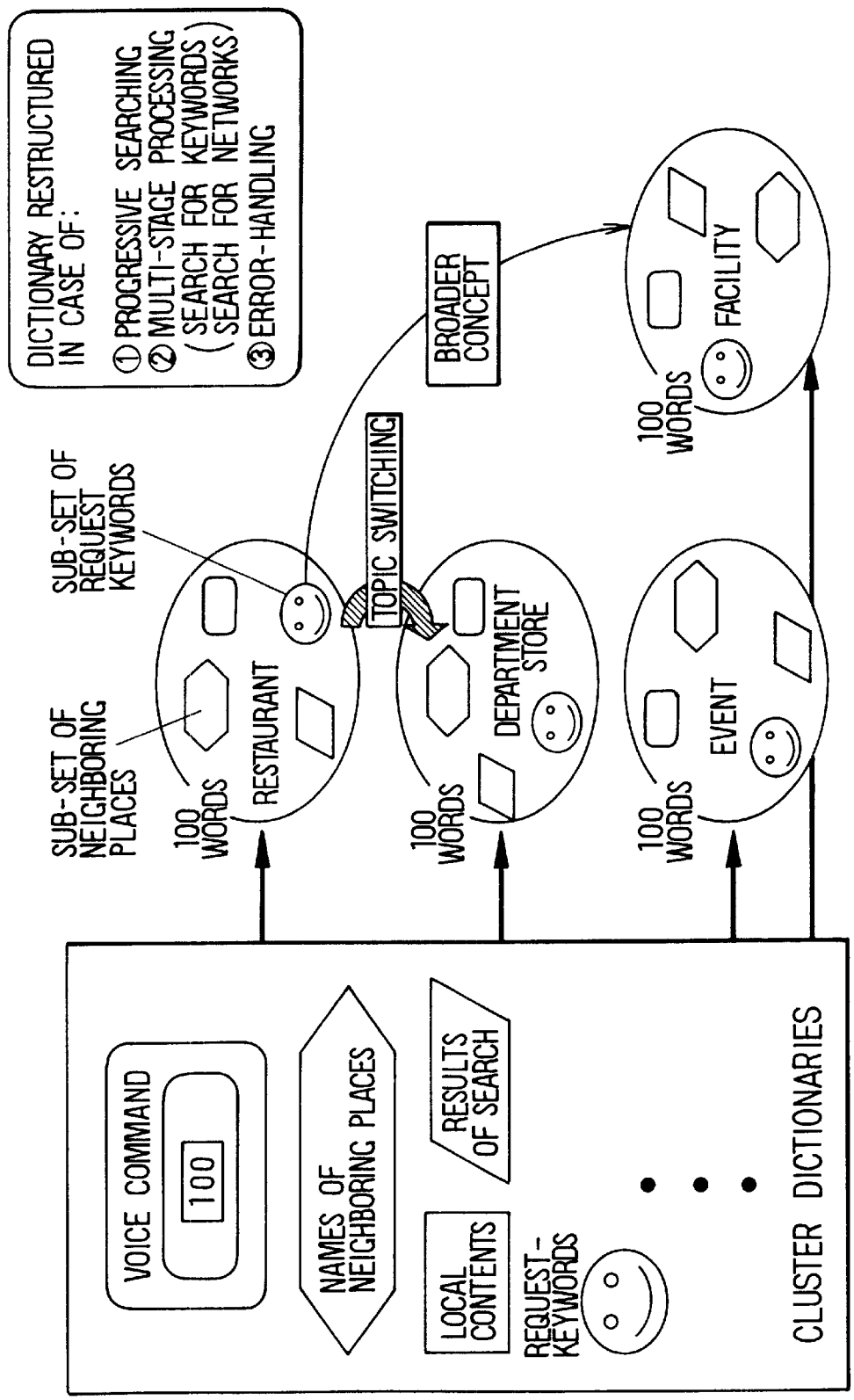
FIG. 17 is a chart showing a concept of dynamic structuring of a dictionary.
Figure 18:
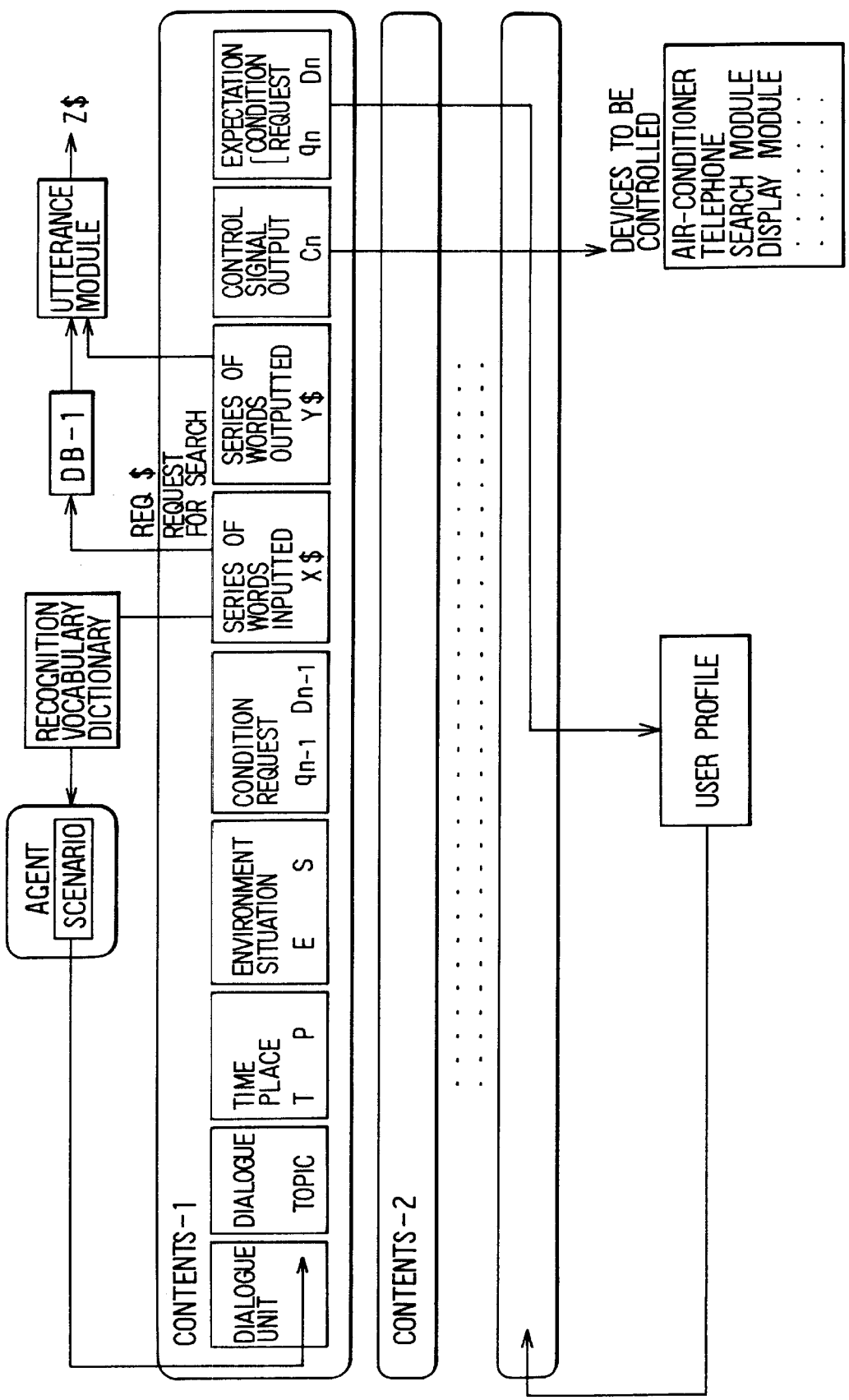
FIG. 18 is a chart showing a structure of a dialogue data base.

The dictionary (this dictionary is also referred to as a recognition dictionary in a certain context) to be used after the topic of the dialogue has been determined based on the user's request is dynamically restructured from the word data base 34 (FIG. 12). The word data base 34 is classified beforehand into cluster dictionaries. For example, the classification may be made as follows. Cluster 1: various commands including navigation, schedule, address and telephone commands. Cluster 2: keywords representing user's requests. Cluster 3: Names of facilities including restaurants (together with dish names, atmosphere, prices), places for skiing or golfing, department stores, play-grounds, parks, movie theaters and hot springs. Cluster 4: Events. Cluster 5: Results of searching. Cluster 6: Names of places, districts and cities. Cluster 7: Station names. Cluster 8: Fundamental words frequently used in dialogues including words for affirmation, negation, inquiry, explanation, reporting, confirmation and so on. In this particular dialogue example given above, the dictionary containing about 100 words relating to restaurant names located in the neighborhood of the destination and dish names is structured using the classified data base. In structuring the dictionary, the user profile stored in the user profile data base 37 (FIG. 12) is also taken into consideration. FIG. 17 shows a concept for structuring or restructuring dictionaries using the data base stored in a group of the cluster dictionaries.

2.4 Networks Among Words

In structuring the dictionary, networks or meaning relations among words contained in a dialogue are also taken into consideration. Those networks and meaning relations are supplied from users and data base suppliers from time to time. A user's utterance can be defined as a group of dialogue vectors, each vector consisting of a word attribute or a combination of word attributes, as exemplified in FIG. 18. The word attribute or the combination of word attributes are exemplified as: dialogue topic (or subject); time and place; environment and situations; conditions and request; user utterance; agent utterance; control signal output; etc. Though there are uncountable numbers of dialogue vectors, only a limited number of vectors are meaningful in a practical man-machine conversation. To constitute a group of vectors in a practical dialogue, the following factors are taken into consideration: classification of meaning, grammatical restriction, topic continuation, physical and common sense restriction, continuity of phenomenon occurrence and so on. A range of words used in a series of words in a user's utterance and a restriction of words to be used in the next utterance are greatly influenced by the word attribute or the combination of word attributes that are main factors for constituting a vector space.

A network relation of one word to other words in a user's utterance is determined based on the following factors: relation among cluster dictionaries; relation among words; relation among topics; continuity of context; user's characteristics and situations; and relation between applications. Based on the above relations, one word W1 activates another word W2 which is added to the recognition dictionary for a next user's utterance. In addition, parameters in the voice recognition module are adjusted to enhance a likelihood value (LFK) accompanying a recognition result.

As to factors for determining a network structure, i.e., relation among cluster dictionaries, relation among words, relation-among topics, continuity of context, and user's characteristics and situations, some more additional explanations will be given, referring to examples. The relation among the cluster dictionaries is considered in structuring a dictionary in the manner described above with reference to FIG. 17. An example: "facilities→skiing ground→Ontake skiing ground"

The relation among words (meaning relation) includes a generic-specific relation and a suggestive relation. Examples of the generic-specific relation are: Chinese foods→shumai, ramen, gioza . . . ; Sports→tennis, ski, swimming, jogging . . . . The suggestive relation includes the following relations: (1) Objects belonging to a same category, e.g., noodle→lemen, somen, ramen, etc. (2) Constituent elements in a given scene, e.g., Gelande→ski→lift, snow-board, goggle, etc; golf→golf park→hole, caddie, fairway, club, etc; seaside→sea bathing→swimming suit, beach parasol, blue sky, white cloud, etc. (3) Interesting subjects in a given scene, e.g., ski→Gelände, snow quality, lift, etc; golf→weather, route, green fee, score, etc. (4) Scenes suggested by a season, e.g., summer→pool, sea bathing, ice candy, locust, air-conditioner, etc. (5) Subjects suggested by request-keywords, e.g., hungry→restaurant, etc.

The recognition dictionary may be formed by activating keywords relating to a present topic or a dialogue subject. In other words, the dictionary is structured based on the relation among topics. The word categories relating to the present topic include means, associated acts, events or the like. An example is: parking lot (means)→restaurant (associated act), bargain sale (associated event), etc.

The recognition dictionary can be structured also based on continuity of context. The continuity of context includes a topic continuity, adequacy of utterance-response relation, connection between dialog units. Usually, a natural conversation continues using closed word categories relating to a specific dialogue topic. In this respect, the recognition dictionary can be structured based on the topic continuity.

The adequacy of utterance-response relation is considered based on a dialogue unit. An utterance by a user or an agent (an on-board system) in an automotive vehicle can be categorized as shown in FIG. 19. That is, an utterance for drawing attention, report, notification, teaching, explanation, instruction, request, warning, urging, and inquiry. On the other hand, a response to such an utterance is categorized as shown in FIG. 19. That is, no response, confirmation, holding, judgement, answer, and others. A combination of an utterance and a response thereto is called a dialog unit. Among possible combinations of utterances and responses, or among possible dialogue units, only some dialogue units are adequate and others are inadequate when a logical relation between an utterance and a response is considered. In FIG. 19, adequate units are circled in the list. The agent can construct a recognition dictionary by expecting words that will be spoken next by the user based on the dialogue unit.

Some examples of the dialogue units are shown below.

(1) Drawing Attention

Ex.1 User's utterance (drawing attention): "Hi, XYZ."
Agent's response: "May I help you?"
Ex.2 Agent's utterance (drawing attention): "Good morning, it's a nice day, isn't it?"
User's response: "Good morning, yes, it is."

(2) Report

Ex. User's utterance (report): "Today, I go driving with my family."
Agent's response (confirmation): "It's nice to drive with your family."

(3) Notification

Ex.1 Agent's utterance (notification): "There is a traffic jam 1 km ahead of you."
User's response (no response): " . . . " or (confirmation): "I see."
Ex.2 Agent's utterance (notification): "My name is XYZ."
User's response (confirmation): "OK, I am U."

(4) Teaching

Ex. User's utterance (teaching): "It started to rain."
Agent's response (confirmation): "Your message that it's raining is confirmed."

(5) Explanation

Ex. Agent's utterance (explanation): "Please say HELP if you don't know how to operate the machine."
User's response (no response): " . . . "

(6) Instruction

Ex. Agent's utterance (instruction): "Please speak your password."
User's response (confirmation): "OK, xxxxxx (password)."

(7) Request

Ex. Agent's utterance (request): "Gasoline is becoming short. Please fill up your gas at the gas stand located at the next intersection."
User's response (holding): "No, I will fill it up later."

(8) Warning

Ex. Agent's utterance (warning): "An accident occurred in the tunnel 10 km ahead. Please get out from the next intersection."
User's response (judgement): "OK, I will get out."

(9) Urging

Ex. Agent's utterance (urging): "User's name is not registered yet. Please register immediately."
User's response (confirmation): "I see."

(10) Inquiry

Ex.1 Agent's utterance (inquiry for agreement): "You do not respond to the phone call. Is it OK to disconnect the phone?"
Ex.2 Agent's utterance (inquiry for selection): "Which do you select A or B?"
Ex.3 User's utterance (inquiry for information): "How much snow is there on the XYZ skiing ground?"
Ex.4 Agent's utterance (inquiry for destination): "Where are you heading?"
Ex.5 User's utterance: "I have to arrive at Okazaki at twelve. Sleepy."
Agent's response (inquiry for confirmation of a sudden topic change): "Did you say SLEEPY? What about going to Okazaki?"

The recognition dictionary is reconstructed, also taking into consideration user's environment, situations, request, conditions, personal profile and the like. In this case, the context continuity mentioned above is not always kept. The vocabulary to be included in a reconstructed dictionary is restricted, using a device for assuming a user's request such as a device disclosed in the earlier filed U.S. application Ser. No. 09/328,339, based on data stored in the request & conditions data base 136 shown in FIG. 12. The recognition dictionary may be restructured according to sudden changes of situations including unexpected emergencies to be warned. In this case, the context continuity is temporarily disregarded and the recognition dictionary is reconstructed so that the sudden situation changes can be dealt with. The following dialogue is an example in this situation.

Ex. Agent: "What do you want from now on?"
User: "I want to shop in front of xxxx station."
Agent: "You will arrive there approximately at 11 o'clock.
Where would you like to park?"
(At this moment, a car driving ahead suddenly stops.)
User: "Wow! I almost hit the car ahead."
Agent: "Be careful! Do you want take a rest a little while?"

When the functions are switched, the agent informs to the user to that effect, and then the recognition dictionary is restructured for being prepared for the next conversation.

2.5 Example of Multi-Stage Processing

Figure 20:
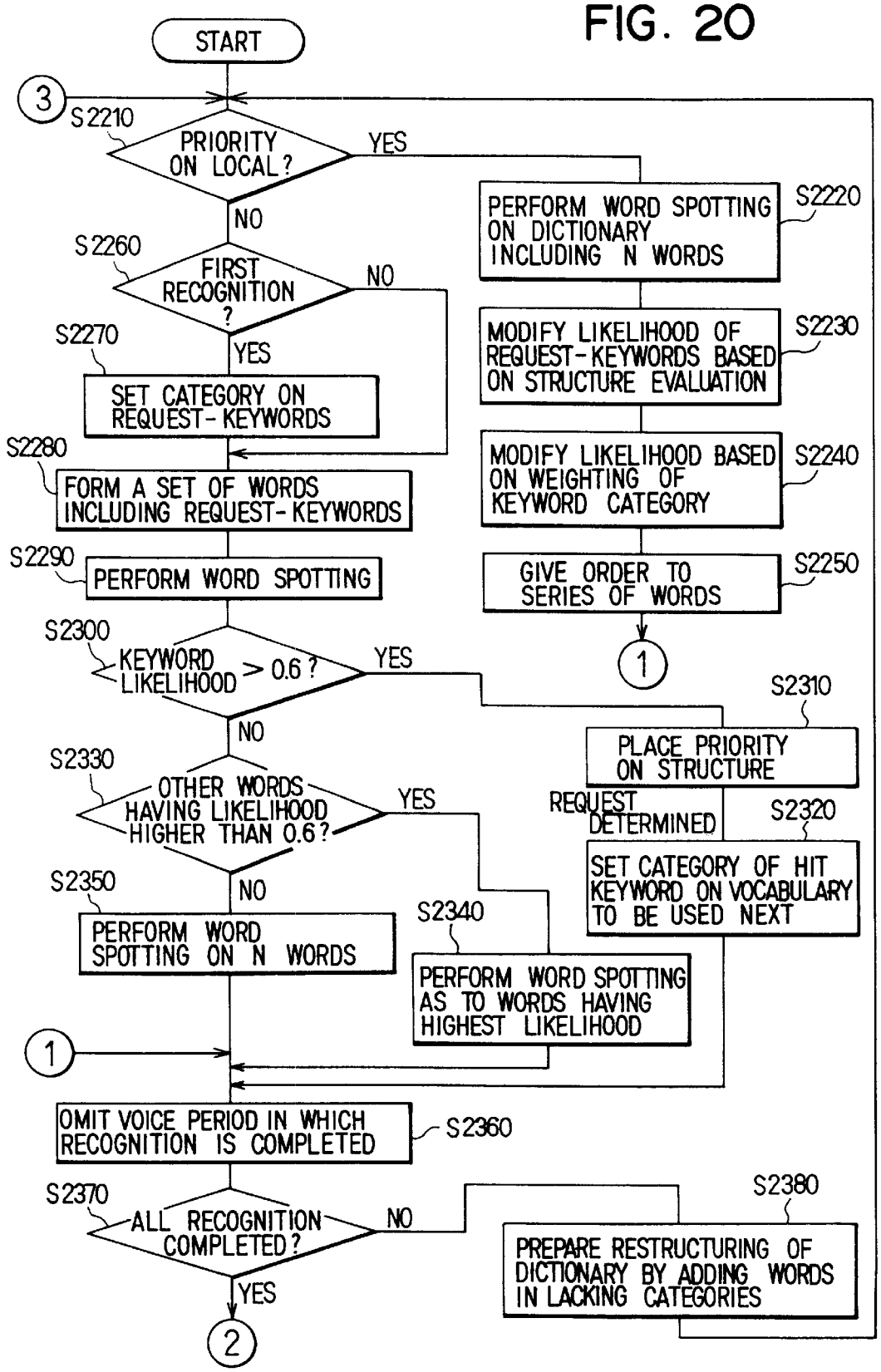
FIG. 20 is a flowchart showing a front half of a multi-stage process.

Referring to the flowchart shown in FIGS. 20 and 21, an example of the multi-stage processing will be described. First, whether priority is placed on local information or not is determined at step S2210. If the priority is placed on the local information, the process moves to step S2220. At step S2220, a dictionary including N words indicating places, facilities, request-keywords and relating matters is structured, and word spotting is performed based on the dictionary. At step S2230, likelihood values of request-keywords are modified based on the sentence structure evaluation. At step S2240, the likelihood values are further modified by weighting the keyword category. Then, at step S2250, plural series of words are aligned in the order of their likelihood. At step S2360, a voice period in which recognition is completed is omitted from the voice periods to be next recognized. At step S2370, whether recognition for all the voice periods is completed or not is determined. If it is not completed, the process moves to step S2380 where preparation for structuring the next dictionary is made by adding words in lacking categories. Then the process returns of step S2210. The process performed in steps S2220–S2250 is not a multi-stage processing, because the priority is placed on the local information. All the voice periods can be processed by one time recognition in the case of local-priority, because about 100 words to be searched can cover all the necessary local information. Therefore, the time required for processing is short, but there is a high possibility of mis-recognition if a given utterance includes contents not covered by the local data.

When it is determined that priority is not placed on the local data at step S2210, the process moves to step S2260 where whether recognition is performed first time or not is determined. If it is the first time, the process moves to step S2270 where a recognition category is set on the request-keywords, and then the process proceeds to step S2280. If it is not the first time, the process moves to step S2280, skipping step S2270. At step S2280, a set of words that includes many words belonging to the recognition category is formed, and then the process moves to step S2290 where the word spotting is performed.

At step S2300, whether the likelihood value of the request-keyword is equal to or higher than a predetermined level or not is determined. In this particular example, the predetermined level is set to 0.6. If the likelihood value is equal to or higher than 0.6, the process proceeds to step S2310, where the sentence structure takes priority if there are plural words belonging to a same category. That is, a request based on the request-keyword (or request-keywords) is finally determined. At step S2320, categories corresponding to hit keywords are set on a next recognition dictionary. At step S2360, voice periods for which recognition is completed are omitted from the recognition object. If it is determined that the recognition is not completed for all the voice periods at step S2370, the process moves to step S2380 where a dictionary renewal is prepared by adding words in lacking categories. Then, the process returns to step S2210.

On the other hand, if it is determined that the likelihood value of the request-keyword is lower than 0.6, the process moves to step S2330, where whether there are words belonging to other categories than that of the request-keyword and having a likelihood value equal to or higher than 0.6. If there is such a word (or words) having a likelihood value equal to or higher than 0.6, the process proceeds to step S2340. At step S2340, a category to which a word having the highest likelihood value belongs is selected as a recognition category, and a set of words that includes many words belonging to the recognition category is formed. The word spotting is performed on that set of words. If there is no word having a likelihood value equal to or higher than 0.6, the process moves from step S2330 to step S2350, where a dictionary having N words belonging to place, facility and request categories is formed, and the word spotting is performed on that dictionary. After steps S2340 and S2350, the process proceeds to steps S2360, S2370 and S2380, where the same operations as described above are performed. Then, the process returns to step S2210.

On the other hand, when it is determined at step S2370 that the recognition for all the voice periods is completed, the process proceeds to step S2390 (FIG. 21) where a series of words is preliminarily determined. Then, the process moves to step S2400 where the agent talks back (echo-back) to the user. Then, at step S2410, the agent makes inquiry for additional information that is necessary to finally determine the series of words, and then the process moves to step S2420. At step S2420, whether the user's response is affirmative or negative to the agent's utterance is determined. If it is affirmative, the process moves to step S2430 where a dictionary renewal is prepared by adding words belonging to lacking categories. Then, the process returns to step S2210 (FIG. 20). If it is determined at step S2420 that the user's response is negative, i.e., if the user responds to the agent, saying "No," "That's wrong," "You misunderstood me," or the like, then the process moves to steps for handling errors that includes steps S2440, S2450, S2460 and S2470.

At step S2440, the process is branched out to one of three alternative modes according to mode setting. The first mode is a continuous word recognition mode which is performed at step S2450, the second is a help mode at step S2460 and the third is a progressive searching mode at step S2470. At step S2450 the agent instructs a method of utterance to the user. At step S2460, the agent requests to input request-keywords. At step S2470, the system displays some words to the user for the progressive searching. Then, the process moves to step S2480 where a dictionary renewal is prepared by adding words in lacking categories, and then returns to step 2210. Details of the error handling process will be described later.

Taking a user's utterance, "WELL . . . , I WANT TO EAT RAMEN IN ANJO." as an example, the multi-stage processing described with reference to the flowchart shown in FIGS. 20 and 21 will be further explained. Request-keywords, "WANT TO EAT" are first detected. For this purpose, a recognition dictionary is structured so that it includes many words relating to requests (synonyms and suggestive words are also included). In this case, a whole series of words cannot be recognized by one time word spotting. Therefore, after the request-keywords are determined, the name of dish the user wants to eat and the place where the user wants to go have to be determined one by one by respectively performing word spotting, as shown in FIG. 16. After all the voice periods are recognized by word spotting, the device for selecting appropriate series of words is operated to select appropriate series of words from among the candidate series of words in the manner described above in the first embodiment.

Upon determination of appropriate series of words, the agent talks back (echo-back) to the user, "Do you want to eat ramen in Anjo?" to confirm the user's utterance. Then, the agent requests additional information necessary to instruct the user the location of the place to eat. For example, the agent speaks, "There are three ramen restaurants in Anjo. Which restaurant do you like?" Assume the situation where the user actually spoke to the system, "I WANT TO BUY A REFRIGERATOR." but the system echoes back as above due to mis-recognition. In this case, the user responds negatively, for example, saying "THAT'S WRONG." Then, the process proceeds to the steps for handling errors (S2440–S2470 in the flowchart). On the other hand, the user does not negate the agent's echoes, the system prepares a next dictionary that includes words relating to a possible next utterance by the user and waits for the next user's utterance (S2430). The new dictionary may includes names of ramen restaurants or other words relating to dining.

3. Error Handling

In case errors are found upon user's negative reaction against the agent's echo, the following alternatives are provided in the system: a help mode, a mode for displaying multiple choices to the user, an inquiry mode and initialization of the system. These alternatives are selected based on various factors such as likelihood values attached to words recognized, a help request from the user, judgement of lacking information and so on.

3.1 Detection of Errors

Mis-recognition of a user's utterance occurs in the following situations: a user's utterance includes a word (or words) which is not included in any dictionary; a user's utterance includes a word (or words) which is not found in a dictionary presently used, though that word is included in other dictionaries; and the agent responds to an utterance other than the user and moves to mode that is not intended by the user. The mis-recognition occurred under those situations is detected when the user responds to the agent with negating words such as "THAT'S WRONG." "NO." or the like, as described above. Upon the negating reaction of the user, either a voice menu mode or a multiple-choice mode is selected according to the user's situation. When the negating reaction is repeated more than K times (e.g., K=5), the system returns to an initial condition. Also, when a likelihood value attached to a word is lower than a predetermined level, that word is judged as an unexpected word, because it is highly possible that mis-recognition occurred.

3.2 Detection of Topic Change

Whether there occurred a topic change is determined by whether an utterance is in line with a context of a continuing dialogue. If the utterance is within the dialogue context, words expected to be spoken next are determined based on the relation among words, which has been described under section 2.4 above, and are registered in a recognition dictionary. This case is categorized as case A, and cases other then case A is categorized as case B.

Case B includes case B1 where the utterance includes a word (or words) which is not registered in the dictionary and case B2 where the utterance includes a word (or words) which relates to a different topic though that word is registered in the dictionary. Case B2 is further divided into case B2$a$ where that word is included in the dictionary that is being presently used and case B2$b$ where that word is not included in the dictionary that is being presently used. The words in case B1 and case B2$b$ cannot be recognized under the normal word spotting. Therefore, those words are regarded as unnecessary words or replaced with other words which are considered similar in signal processing. The errors occurred in cases B1 and B2$b$ are handled under the error handling process described later.

On the other hand, words in cases A and B2$a$ are processed in the following three methods: (1) When there are plural candidate words (lattice) in case A and there are not much difference among their likelihood values, a word which is most suitable in the dialogue context is chosen. (2) When there is only one candidate word in case B2$a$ and its likelihood value is higher than a predetermined level, it is determined that the topic is suddenly changed. (3) When there is only one candidate word in case B2$a$ and its likelihood value is lower than the predetermined level, the agent makes inquiry to the user as to whether the topic is suddenly changed or not.

It is regarded that there is a possibility of a topic change, if a request-keyword that is not related to the present topic is recognized. In this case, the agent makes an inquiry to the user for confirming if there occurred a topic change. For example, the following conversation will be carried out between the agent and the user:

Agent: "There are three ramen restaurants in front of XX station."

User: "I want to call Mr.YY in Tokyo."

Agent: "Do you want to make a call?"

User: "Yes, to Mr.YY in Tokyo."

Agent: "I will connect you to Mr.YY."

As exemplified above, the agent makes an utterance declaring a topic change after it is confirmed by the user.

3.3 Utterance Giving Priority to Context

Assuming that a same topic is still being continued, the next agent's utterance is formed based on that assumption. Therefore, in this case, even if there is a word in a user's utterance that does not relate to the present topic, the next agent's utterance is made based on the previous context without being affected by the word that does not relate to the topic. For example, the following conversation will be done.

Agent: "There are three ramen restaurants in front of XX station." (A continuing topic is dining.)

User: "Oops, I have to make a telephone call." (If the word TELEPHONE is recognized, there is a possibility that the topics have been suddenly changed from "dining" to "telephone."

However, the agent generates the next utterance based on the continuing previous topic.)

Agent: "Which ramen restaurant do you prefer?" (An utterance based on the previous topic, "dining.")

User: "Well . . . , restaurant W."

Agent: "I will show you a route guidance map to restaurant W."

Though the possible topic change is neglected in the above example, the agent may make a next utterance based on the possible new topic, depending on other conditions such as a likelihood value associated with the user's utterance "OOPS, I HAVE TO MAKE A TELEPHONE CALL" and the number of continuous occurrence of the possible new topic "TELEPHONE." For example, if the number of continuous occurrence is larger than 2, and the likelihood value of the user's utterance is higher than 0.4, then the agent determines that the topic has been changed from "dining" to "telephone." The possible topic change under other conditions other than above is neglected.

3.4 Help Mode

Under the help mode, information for helping the user, such as some examples relating to frequently occurring errors or typical request-keywords, is displayed on the panel or spoken by the agent. The following is some examples under the help mode.

Ex.1

User: "Make a call."

Agent: "Please input a telephone number you are calling. If the person you are calling is registered, please speak the name." (showing the telephone number list on the screen at the same time)

Ex.2

Agent: "Please speak once more, using a word displayed on the screen." (showing words such as DINING, RESTAURANT, FOODS, HUNGRY, SCHEDULE LIST, ADDRESS LIST, TELEPHONE NUMBER LIST, MAP, ROUTE GUIDANCE, DRIVING ASSISTANCE)

Ex.3

Agent: "Please select a road map using a route guidance display."

Ex.4

Agent: "To be clear, please indicate your destination together with a word city, town or village after the name of place."

3.5 Display of Multiple-Choice

Figure 21:
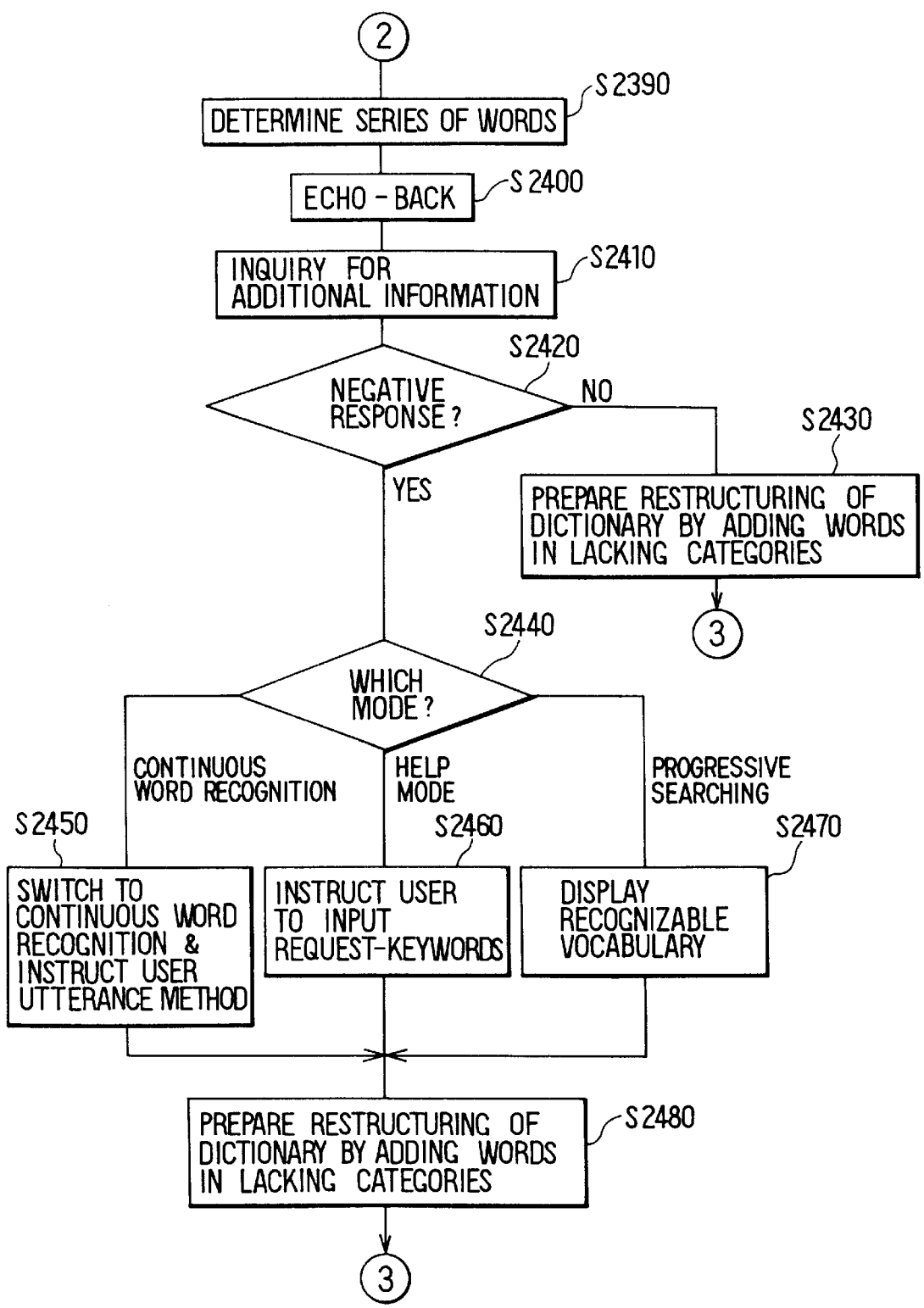
FIG. 21 is a flowchart showing the rest of the multi-stage process.

The progressive searching described in section 1 above is used as a part of the multi-stage processing, as shown in the flowchart of FIG. 21.

3.6 Normal Utterance Strategy

When no errors are detected based on recognition results including words recognized and their liklihood values, a normal utterance strategy is applicable. Since the normal utterance strategy is not a main subject of the present invention, it will not be explained here.

3.7 Dialogue Control Adaptability to Various Situations

A selection of a dialogue topic (or a dialogue subject), dialogue control, communication of a message or a message display on the screen is performed, being adapted to various situations and conditions surrounding a user. Those situations and conditions include: Time (season, date, time in a day), Space (location of a vehicle, region, environment), Road conditions (frozen, slippery, rough), Geographical situations (sea-side, mountains, downtown, front of a station), Outside conditions (wheather, traffic jam, passing cars), Inside conditions (driving conditions, passengers, conversation subject) and so on.

The dialogue control is also adapted to a user's driving schedule including dining, shopping and sight seeing. According to the driving schedule, the agent judges user's requests and/or proposes additional schedule if there is a time space in the schedule. Also, a user's personal schedule may be down-loaded from his personal computer. The dialogue control system can judge or select the user's requests and can make suggestions to the user according to his schedule.

When the user does not understand an agent's response and utters words such as "WHAT DO YOU MEAN?" or "I DON'T UNDERSTAND," one of the following processes is selected: a help mode, menu selection or voice menu. The agent cannot properly respond to the user even though the user's utterance is correctly recognized under the following situation: when no data base is available, when a device to be used is not equipped or not connected (e.g., a telephone is not connected), or when the user's demand is beyond capability of a device. In those situations, the agent informs to the user to this effect.

3.8 Inquiry from Agent

There are various situations where the agent needs to make an inquiry to the user. Some of those examples are shown below.

When a user's utterance is not in line with a topic which is correctly recognized by the agent, the agent makes an inquiry for confirming the topic and for avoiding any possible errors in a later dialogue. The following dialogue is an example.

Agent: "There are three ramen restaurants in front of XXX station."

User: "I want to call Mr.Y in Tokyo."

Agent: "Do you make a telephone call?"

When the user responds to the agent with negating words, such as "NO," or "THAT'S WRONG," under the situation where the agent misunderstood the topic and made an inquiry for additional information relating to a wrong topic, the agent asks the user as to what the correct topic is. Further errors are avoided in this manner. The following is an example under this situation.

User: "I want to call Mr.Y in Tokyo."

Agent: "I will display some restaurants near station W which do you like?"

User: "No, that's wrong, I want to make a telephone call."

Agent: "Telephone call, or dining?"

User: "Telephone call."

The above situation may happen, if the user has already requested to search restaurants, and then he suddenly changes his mind to make a telephone call. Therefore, the agent makes an inquiry for confirming the user's priority.

When the agent correctly understands a present topic or a user's request, and some additional information is necessary for the agent to form a correct response, the agent asks for the additional information. Examples under this situation are given below.

Ex.1

User: "I want to call Mr.Y in Tokyo."

Agent: "You make a telephone call to Mr.Y in Tokyo. Which Mr.Y, Mr.M.Y or Mr.K.Y?"

User: "Mr.K.Y."

Agent: "I will connect you to Mr.K.Y."

Ex.2

User: "I want to call Mr.Y in Tokyo."

Agent: "I will display restaurants near station W. Which restaurant do you choose?"

User: "I want to make a call before eating."

Agent: "I will connect you to Mr.Y in Tokyo. Is it OK?"

User: "Yes, go ahead."

In Ex.1 above, the agent correctly understands the user's request and requires additional information. In Ex.2, the agent tries to give information regarding restaurants because the agent knows the user is going to dine at this time according to his schedule, but the user wants to call before dining. Therefore, the agent confirms the user's intention which he wants to do first.

3.9 Initialization

In case the user asks back the agent more than predetermined times (K>N), the system is initialized or returns to a top menu.

According to the present invention, the system performs the progressive searching, the multi-stage processing, the unexpected situation handling and the error handling. Advantages of those process are summarized below. In the progressive searching, possible candidate words expected to be spoken next by the user are shown to the user right after a first word is recognized before a whole series of words included in an utterance is recognized. For example, when the user speaks to the system "I WANT TO EAT INDIAN FOODS IN OKAZAKI.", the system shows candidate food names right after the words WANT TO EAT are recognized, before the whole utterance is recognized. In this manner, it is avoided that the user speaks next words that are not included in the recognition dictionary, and accordingly recognition errors are avoided.

In the multi-stage processing, words representing a user's request (request-keywords) are first determined, and thereafter a recognition dictionary including a relatively small number of words relating to the request is dynamically structured. In structuring the dictionary, relation among words and other circumferential situations and conditions are also taken into consideration. In this manner, unexpected recognition errors are avoided to the extent possible.

In the unexpected situation handling, when the user's utterance is not in line with a dialogue context, the agent confirms whether the topic or subject is switched to another one, or the agent neglects such a topic change under a certain situation. In the error handling, when the user negates an agent's response, the agent makes an inquiry for confirming a correct topic, starts the help mode for assisting the user, or initializes the system. In this manner, such a situation that the user is trapped in trouble caused by errors is avoided.

Since all of the four processes, i.e., the progressive searching, the multi-stage processing, the unexpected situation handling and the error handling are all combined in the second embodiment, the system determines very effectively the series of words. Though the system according to the present invention is described in connection with a navigation system mounted on an automotive vehicle, the present invention is also applicable to other systems. For example, a series of hand-written words or a picture image such as a finger language converted into a natural language may be processed in the same manner as in the voice input. Recognition errors are similarly avoided in those cases. Though the multi-stage processing is first performed and then the progressive searching follows within the error handling process in the flowchart shown in FIG. 13, the order of the processes is not limited to that of the particular example. Further, it is not necessary to combine all the four processes in a system, rather they may be separately performed in a system. However, it is preferable to combine two or more processes in a system to enhance advantages of the present invention.

Programs for performing various processes in the apparatus may be stored in a memory such as a floppy disc or a CD-ROM. Such programs stored in the memory may be downloaded to a computer that operates the apparatus.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An apparatus for determining appropriate series of words carrying information to be recognized, the apparatus comprising:

means for generating a plurality of candidate series of words with reference to a recognition dictionary contained in the apparatus, based on an original series of words inputted to the apparatus; and means for selecting one or more appropriate series of words from among the plurality of candidate series of words based on a predetermined verification as to statistical appropriateness as a natural language.

2. The apparatus for determining appropriate series of words as in claim 1, wherein:

the verification includes standpoints of grammar, meaning and a common sense.

3. The apparatus for determining appropriate series of words as in claim 1, wherein:

the verification includes evaluation according to sentence structure evaluation tables which list all order-of-words combinations as to words included in the candidate series of words and respective evaluation scores corresponding to each order-of-words combination; and the order-of-words combinations having the score higher than a predetermined level are selected as the appropriate series of words.

4. The apparatus for determining appropriate series of words as in claim 1, wherein:

the verification includes at least a standpoint selected from a group consisting of: situations and environment of the information to be recognized; when the information to be recognized is originated by a person, his/her request and situations; and when the apparatus is used to recognize a dialogue, a context of the dialogue.

5. The apparatus for determining appropriate series of words as in claim 1, wherein:

the information to be recognized is human voice.

6. The apparatus for determining appropriate series of words as in claim 1, wherein:

the information to be recognized is hand-written words.

7. The apparatus for determining appropriate series of words as in claim 1, wherein:

the information to be recognized is a series of words formulated from picture images into a natural language.

8. The apparatus for determining appropriate series of words as in claim 7, wherein:

the picture images are images showing a finger language.

9. An apparatus for determining appropriate series of words carrying information to be recognized, the apparatus comprising:

means for generating a plurality of candidate series of words with reference to a recognition dictionary contained in the apparatus, based on an original series of words inputted to the apparatus; and means for selecting one or more appropriate series of words from among the plurality of candidate series of words based on predetermined evaluation criteria that include an evaluation score given to each order-of-words combination formed from words contained in the candidate series of words, all the possible order-of-words combinations and the respective evaluation scores being listed in sentence structure evaluation tables contained in the apparatus.

10. An apparatus for determining appropriate series of words carrying information to be recognized, the apparatus comprising:

means for inputting an original series of words to the apparatus;

means for generating candidate words sequentially word by word with reference to a recognition dictionary, based on the inputted original series of words; and progressive searching means for displaying candidate words expected to be next inputted by the user after a preceding word is determined and for progressively displaying following candidate words after a preceding word is determined until a whole series of word is finally determined.

11. The apparatus for determining appropriate series of words as in claim 10, wherein:

the progressive searching means displays the candidate words expected to be next inputted only when the next word is not actually inputted by the user within a predetermined period of time after the preceding word has been determined.

12. The apparatus for determining appropriate series of words as in claim 10, wherein:

the progressing searching means displays again the candidate words expected to be next inputted by the user if the actually inputted next word is not one of the candidate words.

13. An apparatus for determining a series of words carrying information to be recognized, the apparatus comprising:

means for generating at least a candidate series of words with reference to a recognition dictionary contained in the apparatus, based on an original series of words inputted by a user of the apparatus; and multi-stage processing means for first determining a dialogue topic based on inputted words belonging to a predetermined word category, then reconstructing the recognition dictionary that only includes words relating to the determined dialogue topic and then recognizing other words included in the candidate series of words.

14. The apparatus for determining a series of words as in claim 13, wherein:

the predetermined word category is a word category to which words representing a request of the user belong.

15. The apparatus for determining a series of words as in claim 13, wherein:

one word, based on which the dialogue topic is determined, is selected from among the words belonging to the predetermined word category when there are a plurality of such words.

16. The apparatus for determining a series of words as in claim 13, wherein:

only the words having a likelihood value higher than a predetermined level are used to determine the dialogue topic.

17. The apparatus for determining a series of words as in claim 13, wherein:

the recognition dictionary reconstructed further includes words relating to other dialogue topics that relate to the determined dialogue topic.

18. The apparatus for determining a series of words as in claim 13, wherein:

a dialogue context is further taken into consideration in reconstructing the recognition dictionary.

19. The apparatus for determining a series of words as in claim 13, the apparatus further including means for presuming a request of the user, wherein:

words to be determined from a standpoint of the presumed request are also included in the reconstructed recognition dictionary.

20. The apparatus for determining a series of words as in claim 13, wherein:

words corresponding to unexpected emergency and warning are also included in the reconstructed recognition dictionary.

21. An apparatus for determining series of words carrying information to be recognized, the apparatus comprising:

means for generating at least a candidate series of words with reference to a recognition dictionary contained in the apparatus, based on an original series of words inputted by a user of the apparatus; and means for handling an unexpected situation that judges whether the candidate series of words is in line with a previous dialogue context and performs, if it is judged that the candidate series of words is out of the previous dialogue context, at least one process selected from a group consisting of: a process for making an inquiry to the user for confirming whether the dialogue topic has been changed to a new topic; a process for declaring that the dialogue topic has been changed; and a process for giving priority to the previous dialogue topic on a presumption that the previous dialogue context is still continuing.

22. The apparatus for determining series of words as in claim 21, wherein:

the generating means further outputs a likelihood value associated with the generated series of words; and the handling means judges whether the series of words is in line with the dialogue context based on the likelihood value.

23. The apparatus for determining series of words as in claim 22, wherein:

the handling means performs the process for making an inquiry, if only one candidate series of words is newly outputted from the generating means and if the likelihood value associated with that series of words is higher than a predetermined levels.

24. The apparatus for determining series of words as in claim 21, wherein:

the handling means performs the process for declaring the dialogue topic has been changed to a new topic, if the series of words outputted from the generating means after performing the process for making an inquiry is in line with the new topic.

25. The apparatus for determining series of words as in claim 21, wherein:

the handling means performs the process for giving priority to the previous dialogue topic immediately after the dialogue topic is changed and performs the process for making an inquiry only when the new topic continues thereafter.

26. An apparatus for determining a series of words carrying information to be recognized, the apparatus comprising:

means for generating at least a candidate series of words with reference to a recognition dictionary contained in the apparatus, based on an original series of words inputted by a user of the apparatus; and means for handling errors that determines whether a content of the candidate series of word accords with an intent of the user and performs a process for handling errors if it is determined that the content does not accord with the user's intent.

27. The apparatus for determining series of words as in claim 26, wherein:

the error handling means performs a process for making inquiry to the user for confirming a correct dialogue topic.

28. The apparatus for determining series of words as in claim 26, wherein:

the error handling means performs a help mode under which keywords for confirming the user's intent are given to the user either visually or audibly.

29. The apparatus for determining series of words as in claim 26, wherein:

the error handling means performs a process for initializing the apparatus.

30. The apparatus for determining series of words as in claim 27, wherein:

the error handling means performs either a help mode for assisting the user or a process for initializing the apparatus, when the process for making inquiry is repeated in excess of a predetermined number of times.

31. An apparatus for determining a series of words carrying information to be recognized, the apparatus comprising:

means for generating at least a candidate series of words with reference to a recognition dictionary contained in the apparatus, based on an original series of words inputted by a user of the apparatus; and means for restructuring the recognition dictionary that includes words relating to a present dialogue topic.

32. The apparatus for determining a series of words as in claim 31, wherein:

the recognition dictionary that includes words relating to the present dialogue topic is restructured based on plural cluster dictionaries each including words belonging to a word category.

33. The apparatus for determining a series of words as in claim 31, wherein:

the recognition dictionary that includes words relating to the present dialogue topic is restructured considering meaning relation among words.

34. The apparatus for determining a series of words as in claim 33, wherein:

the meaning relation includes a generic-specific-relation among words.

35. The apparatus for determining a series of words as in claim 33, wherein:

the meaning relation includes a suggestive relation among words.

36. An apparatus for determining a series of words carrying information to be recognized, the apparatus comprising:

means for generating at least a candidate series of words with reference to a recognition dictionary contained in the apparatus, based on an original series of words inputted by a user of the apparatus; and means for restructuring the recognition dictionary that includes words in line with continuity of a context of a present dialogue.

37. The apparatus for determining a series of words as in claim 36, wherein:

the recognition dictionary is restructured considering adequacy of a response to an utterance.

38. The apparatus for determining a series of words as in claim 36, wherein:

the recognition dictionary is restructured considering adequacy of relation among dialogue units.

39. An apparatus for determining a series of words carrying information to be recognized, the apparatus comprising:

means for generating at least a candidate series of words with reference to a recognition dictionary contained in the apparatus, based on an original series of words inputted by a user of the apparatus;

means for presuming a request of the user; and means for restructuring the recognition dictionary that includes a vocabulary relating to the presumed request.

40. An apparatus for determining a series of words carrying information to be recognized, the apparatus comprising:

means for generating at least a candidate series of words with reference to a recognition dictionary contained in the apparatus, based on an original series of words inputted by a user of the apparatus; and means for restructuring the recognition dictionary that includes predetermined words relating to unexpected emergencies and warnings.

41. The apparatus for determining appropriate series of words carrying information to be recognized, the apparatus comprising:

means for inputting an original series of words to the apparatus;

means for generating at least a candidate series of words with reference to a recognition dictionary contained in the apparatus, based on an original series of words inputted by a user of the apparatus; and at least two means selected from a group consisting of the progressive searching means recited in claim 10, the multi-stage processing means recited in claim 13, the means for handling an unexpected situation recited in claim 21, the means for handling errors recited in claim 26, and the means for restructuring the recognition dictionary recited in claim 31.

42. A method of determining a series of words uttered by a user through a voice recognition system, the method comprising steps of:

the user inputting his/her first word into the system;

the system recognizing the inputted user's voice with reference to a recognition dictionary containing a certain number of words frequently used;

the system outputting a plurality of candidate words corresponding to a first word inputted;

the user selecting a proper word from among the plurality of candidate words by uttering that word;

the system showing the user a plurality of candidates words that are expected to be spoken as a second word;

the user selecting a proper word from among the shown candidate words by uttering that word; and the system and the user repeating the above steps until a series of words is all properly recognized and determined.

43. A method of determining a series of words uttered by a user through a voice recognition system, the method comprising steps of:

the user inputting a series of words into the system;

the system determining a dialogue topic from the series of words inputted with reference to a recognition dictionary containing a certain number of words relating to popular topics;

the system reconstructing the recognition dictionary so that the dictionary only includes words relating to the determined dialogue topic;

the system selecting a few candidate words relating to the dialogue topic from the restructured recognition dictionary and showing those to the user;

the user selecting a proper word from among the candidate words; and the system and the user repeating the steps of showing candidate words and selecting a proper word until a whole series of words uttered by the user is properly recognized and determined.

44. The apparatus as in claim 10, 13, 21, 26 or 31, wherein:

the information to be recognized is human voice.

45. The apparatus as in claim 10, 13, 21, 26 or 31, wherein:

the information to be recognized is hand-written words.

* * * * *